United States Patent [19]

Matyas et al.

[11] Patent Number: 4,924,514
[45] Date of Patent: May 8, 1990

[54] PERSONAL IDENTIFICATION NUMBER PROCESSING USING CONTROL VECTORS

[75] Inventors: Stephen M. Matyas, Manassas, Va.; Dennis G. Abraham, Concord, N.C.; Donald B. Johnson, Manassas, Va.; Ramesh K. Karne, Herndon, Va.; An V. Le, Arlington, Va.; Rostislaw Prymak, Dumfries, Va.; Julian Thomas, Lagrange, N.Y.; John D. Wilkins, Somnerville, Va.; Phil C. Yeh, Poughkeepsie; Ronald M. Smith, Wappingers Falls, both of N.Y.

[73] Assignee: International Business Machines Corporation, Armonk, N.Y.

[21] Appl. No.: 398,300

[22] Filed: Aug. 24, 1989

Related U.S. Application Data

[63] Continuation of Ser. No. 237,938, Aug. 26, 1988, abandoned.

[51] Int. Cl.$^5$ ............................................. H04L 9/02
[52] U.S. Cl. ........................................ 380/24; 380/25; 380/45; 380/49
[58] Field of Search ............................. 380/21, 23–25, 380/45, 49

[56] References Cited

U.S. PATENT DOCUMENTS

| | | | |
|---|---|---|---|
| 4,218,738 | 8/1980 | Matyas et al. | 380/25 |
| 4,223,403 | 9/1980 | Konheim et al. | 380/24 |
| 4,227,253 | 10/1980 | Ehrsam et al. | 380/49 |
| 4,386,233 | 8/1983 | Smid et al. | 380/25 |
| 4,500,750 | 2/1985 | Elander et al. | 380/21 |
| 4,503,287 | 3/1985 | Morris et al. | 380/25 |
| 4,578,530 | 3/1986 | Zeidler | 380/24 |
| 4,633,037 | 12/1986 | Serpell | 380/24 |
| 4,683,968 | 8/1987 | Applebaum et al. | 380/25 |
| 4,713,753 | 12/1987 | Bobert et al. | 380/25 |
| 4,723,283 | 2/1988 | Nasagawa et al. | 380/24 |
| 4,723,284 | 2/1988 | Munck et al. | 380/25 |
| 4,747,050 | 5/1988 | Brachtl et al. | 380/24 |
| 4,755,940 | 7/1988 | Brachtl et al. | 380/24 |

Primary Examiner—Salvatore Gangialosi
Attorney, Agent, or Firm—John E. Hoel

[57] ABSTRACT

Cryptographic PIN processing is achieved in an improved manner by associating control vectors with the PIN generating (verification) keys and PIN encrypting keys which provide authorization for the uses of the keys intended by the originator of the keys. The originator may be the local cryptographic facility (CF) and a utility program under the control of a security administrator, or the originator may be another network node which uses the key management methods described in the above-referenced copending patent applications to distribute said keys.

Among the uses specified by the control vector are limitations on the authority to use the associated key with certain PIN processing instructions, such as PIN generation, verification, translation and PIN block creation. Furthermore, the control vector may limit the authority of certain instructions to process clear PIN inputs (such as in PIN verification). The control vector may contain information identifying and, possibly restricting, PIN processing to a particular PIN format or particular processing algorithm.

The control vector implementation provides a flexible method for coupling format, usage, and processing authorization to keys. The system administrator can exercise flexibility in changing the implementation of his security policy by selecting appropriate control vectors in accordance with the invention. Furthermore, a method is provided for the security administrator to restrict certain PIN format translations.

51 Claims, 10 Drawing Sheets

FIG. 6

| CV TYPE PIN PEK KEY | EXPO CTRL | USAGE CREATE PINBLK | GEN PIN | VER PIN | XPIN IN | XPIN OUT | AV | SOFTWARE CV USAGE VERS | | EXTEN- SION | RESERV- ED | PARITY |
|---|---|---|---|---|---|---|---|---|---|---|---|---|
| 4B 3B | 1B | 1B | 1B | 1B | 1B | 1B | 2B | 6B | 6B | 2B | 27B | 8B |
| CF | CF | CF | | | | | CF | CFAP | | CF | CF | CF |

FIG. 7

| CV TYPE PIN PGK KEY | EXPORT CONTROL | USAGE GENPIN | GPIN | VERPIN | VPIN | AV | SOFTWARE CV USAGE VERS. | | EXTEN- SION | RESERV- ED | PARITY |
|---|---|---|---|---|---|---|---|---|---|---|---|
| 4B 3B | 1B | 2B | 1B | 1B | 1B | 2B | 6B | 6B | 2B | 27B | 8B |
| CF | CF | CF | | | | CF | CFAP | | CF | CF | CF |

PERSONAL IDENTIFICATION NUMBER PROCESSING USING CONTROL VECTORS

BACKGROUND OF THE INVENTION

1. Technical Field

The invention disclosed broadly relates to data processing technology and more particularly relates to cryptographic applications in data processing.

2. Background Art

References—The following copending patent applications are related to this invention and are incorporated herein be reference:

B. Brachtl, et al., "Controlled Use of Cryptographic Keys via Generating Stations Established Control Values", Ser. No. 55,502, filed March 1987 and assigned to IBM Corporation, and incorporated herein by reference.

S. M. Matyas, et al., "Secure Management of Keys Using Control Vectors", filed August 1988, and assigned to IBM Corporation, and incorporated herein by reference.

S. M. Matyas, et al., "Data Cryptography Operations Using Control Vectors", filed August 1988 and assigned to IBM Corporation, and incorporated herein by reference.

Introduction—Every day electronic funds transfer (EFT) systems electronically transfer billions of dollars between institutions and individuals. Such transactions cannot be processed safely unless user identities can be validated securely and the correct, unaltered transmission of messages between network nodes can be assured.

A personal identification number (PIN) is a secret number assigned to, or selected by, the holder of a debit or credit card used in an electronic funds transfer (EFT) or point of sale (POS) system. The PIN serves to authenticate the cardholder to the system. Cryptography is employed in EFT and POS systems to insure the confidentiality and integrity of PINs and other EFT transactions.

Cryptography is the transformation of intelligible information into apparently unintelligible form in order to conceal the information from unauthorized parties. Cryptography is the only known practical method to protect information transmitted through communications networks that use land lines, communications satellites and microwave facilities. It can also be used not only to protect the privacy of data, but also the integrity of data.

The cryptographic transformation of data is ordinarily defined by a selected algorithm, or procedure, under the control of a key. Since the algorithm is normally public knowledge, protection of the transformed, or enciphered, data depends on secrecy of the key. Thus, the key must be kept secret to prevent an opponent from simply using the known algorithm and key to recover the enciphered data. The protection of the data therefore hinges on protection of secret keys.

A new approach to Key Management is described in the above-mentioned copending application by S. M. Matyas, et al, which also provides a good background for this invention. The invention disclosed herein deals with cryptography PIN processing which has as its objective the application of cryptographic keys and methods to protecting the confidentiality and integrity of PINs during generation, translation, distribution, and verification whereas the S. M. Matyas, et al. copending patent application deals with the generation, distribution and management of the keys themselves.

In order for the PIN to function properly, it must be known only to the cardholder and to the financial institution or institutions capable of authenticating the cardholder, but to no one else.

The PIN must contain enough digits so that an adversary (cardfinder, thief or counterfeiter) would have little chance of finding a correct PIN via repeated guesses (or trial and error). But the PIN should not contain too many digits, otherwise it will slow down the transaction time. The longer the PIN the more difficult it is to remember and the greater the probability of an entry error. Four to six decimal digit PINs are the industry standard, although longer PINs are sometimes employed as a customer-selected option.

It is customary to place a limit on the number of consecutive incorrect PIN entries that a cardholder is allowed. Ordinarily, transactions are aborted after three incorrect PIN entries. This makes it difficult for an adversary to guess a correct PIN via PIN exhaustion. Card retention is also sometimes employed as a means to discourage unauthorized card usage.

The Bank Card and PIN as a Means for User Authentication

A user is normally provided with an embossed, magnetic stripe identification card (bank card) containing an institution identification number, the card's expiration date, and a primary account number (PAN). The institution at which the customer opens his/her account and which provides the user with a bank card, is called the issuer. At an entry point to the system, information on the user's bank card is read into the system and the user enters a secret quantity called the personal identification number (PIN). If the cardholder has supplied the correct PIN and if the balance in the account is sufficient to permit the transaction and if that type of transaction is allowed for that account, the system authorizes the funds transfer.

Electronic Funds Transfer and Point of Sale Environment

Consider a network configuration as shown in FIG. 1. The entry point at which transaction requests are initiated, such as a point of sale (POS) terminal or an automated teller machine (ATM), is defined as an EFT terminal. An institution's computer facility, which also happens to manage the connected EFT terminals, is referred to as a host processing center (HPC). The three HPCs shown in FIG. 1 are interconnected via an intelligent switch. The switch, which can be another HPC, establishes connections between the HPCs so that information can be routed in the network efficiently. A communications control unit (CC), an independent device positioned in the path between an HPC and its associated EFT terminals and between an HPC and adjacent network nodes, is responsible for managing data transmissions over the communications links. Similarly, EFT terminals are assumed to provide complementary support for link management functions. The CC has the capacity to verify systems users and data.

The HPC that first acts on information entered at an EFT terminal is the acquirer (acquiring HPC). A user who initiates a transaction at an EFT terminal may be a customer of a local institution (HPC X, in which case the acquirer is also the issuer) or a remote (distant)

institution (HPC Y or HPC Z). If a user can initiate transactions at an entry point not controlled by the issuer, the supporting network is called an interchange system.

EXAMPLE WITHOUT CRYPTOGRAPHY

Consider a simple transaction in which cryptography is not employed. This is illustrated in FIG. 2. A customer wishes to use a bank card to pay a grocery bill of $35.00 and to receive an additional $50.00 in cash. The grocer's account is with institution X and the customer's account is with institution Y. The customer's card is inserted into the EFT terminal, either by the customer or by an employee of the retailer attending the EFT terminal, and the customer enters in PIN via a suitable entry device such as a keyboard or a PIN pad, which looks and operates much like a hand-held calculator. Similarly, the grocer enters a transfer request for $85.00 to be transferred from the customer's account to the grocer's account ($35.00 for the groceries plus the $50.00 to be given to the customer).

For purposes of transmission and processing, the PIN is stored as a 16 decimal digit PIN block (8 bytes). Several PIN block formats have been standardized, or through use are now de facto standards.

The information entered at the EFT terminal is assembled into a debit request message. This message or transaction request, which includes the customer's PIN (i.e., the 8 byte PIN block), his account number (PAN), and suitable routing information, is then sent via the acquirer (HPC X) and switched to the issuer (HPC Y).

Upon receiving the debit request, the HPC Y verifies that the PIN correlates properly with the customer's PAN, and that the customer's account balance is sufficient to cover the $85.00 transfer. If the PIN check fails, the user is normally given at least two more chances to enter the correct PIN. If after the additional tries the PIN is still rejected, HPC Y sends a negative reply to HPC X. If the PIN is correct but the account balance is insufficient to cover the transfer, HPC Y denies the debit request by sending a negative reply or debit refusal (insufficient funds) message to HPC X. A message is then sent via the network to the grocer's EFT terminal indicating to the grocer that the funds transfer has been disapproved.

If the debit request is approved, HPC Y records the debit request, reduces the customer's account balance by $85.00, and transmits a positive reply or debit authorization message back to HPC X. Upon receiving the debit authorization HPC X takes two actions. A message is sent to the grocer's EFT terminal, indicating to the grocer that the funds transfer has been approved. Then HPC X credits the grocer's account with $85.00. This completes the transaction.

When the cardholder is authenticated by the issuer's HPC or the HPC of another designated node, the process is said to operate in the on-line mode. If the cardholder is authenticated by the terminal, the process is said to operate in the off-line mode.

EXAMPLE WITH CRYPTOGRAPHY

Consider now the same simple transaction in which cryptography is employed. This is illustrated in FIG. 3. In this case, the PIN block derived from the customer entered PIN (and, in some cases, other data) is encrypted with a secret PIN encrypting key PEK1. For sake of discussion, the PIN block format is assumed to be IBM encrypting PIN pad format. The PIN encrypting key is shared between the EFT terminal and the acquirer (HPC X).

At the acquirer (HPC X), the encrypted PIN block is translated from encipherment under PIN encrypting key PED1 to encipherment under PIN encrypting key PEK2. PEK2 is a PIN encrypting key shared between the acquirer (HPC X) and the switch. Likewise, at the switch, the encrypted PIN block is translated from encipherment under PEK2 to encipherment under PEK3. PEK3 is a PIN encrypting key shared between the switch and the issuer (HPC Y). The cryptographic PIN translation operation is accomplished via a PIN Translate instruction.

At the issuer (HPC Y), the encrypted PIN block is reformatted from IBM encrypting PIN pad format to IBM 3624 format. This cryptographic operation is also performed via a PIN Translate instruction, except here the input and output PIN encrypting keys can be the same. The operation consists of decrypting the PIN block under PEK3, reformatting the PIN block from the IBM encrypting PIN pad format to the IBM 3624 format and reencrypting the resultant PIN block under PEK3. (It is also possible to reencrypt the resultant PIN block under a different key PEK4.) The reformatted PIN block is then verified using a Verify PIN instruction. The Verify PIN instruction accepts as inputs the encrypted PIN block (in 3624 PIN block format), the PAN, the encrypted value of PEK3, and an encrypted system-defined PIN Generating Key PGK (also called a PIN validation key). Internally, the customer's PIN is recovered from the decrypted PIN block. This PIN is compared for equality with a similar system generated PIN derived from the customer's PAN, the decrypted PIN Generating Key (PGK), and other algorithm dependent data supplied to the instruction, which is unimportant to the discussion. The Verify PIN instruction returns a "1" if the entered PIN and internally computed PIN values are equal, otherwise it returns a "0".

The same algorithm used in PIN validation to create the internally computed PIN value is also used to generate PINs. Generated PINs can be output in clear or encrypted form.

In summary, four cryptographic instructions are required to properly support PIN processing functions: Create PIN Block, PIN Translate, Verify PIN, and Generate PIN. The Create PIN Block instruction creates a PIN block, in one of several formats from a customer entered PIN and other user and system dependent data, and encrypts the PIN block under a supplied encrypted PIN encrypting key (PEK). The PIN Translate instruction provides two functions. It can be used to reencipher a PIN block from encipherment under a first PIN encrypting key to a different second PIN encrypting key. It can also be used to reformat the PIN block, i.e., from a first PIN format to a second PIN format. The Verify PIN instruction is used in validating system generated PINs, i.e., PINs originally generated from a system PIN Generating Key (PGK). Clear PINs are ordinarily sent to respective cardholder using PIN mailers (special envelopes allowing the PINs to be printed on the inside of the envelope but such that the PIN does not appear on the outside of the envelope). The Generate PIN instruction is used in generating system supplied PINs. In those cases where customers select their own PINs, an offset value is recorded on the customer's bank card. The offset, when combined with the entered PIN value, produces a value (called the derived PIN) which can be compared for equality with the system generated PIN. Thus, the Verify PIN instruction is employed even in situations where customers select their own PIN values.

FIG. 4 shows two methods whereby a customer enters a personally selected PIN, i.e., via a non-encrypting PIN pad or via an encrypting PIN pad. The output in either case is sent to the PIN generating system. See FIG. 5. The PIN generating system optionally accepts a customer selected PIN (CSPIN), internally generates a PIN from the PAN and other data, then outputs either the internal PIN or its Offset from CSPIN, if CSPIN is provided. Offsets are written to the customer's new bank card. If CSPIN is not provided, the internally generated PIN is printed on a PIN mailer and mailed to the customer. The bank card with magnetically encoded PAN and optional Offset is also mailed to the customer. PIN Mailer printers and bank card writers may be located at remote sites.

PIN Processing Requirements

PIN processing requirements can be summarized as follows:

1. Generate PINs both in encrypted and clear form suitable for the preparation of PIN mailers.
2. Generate PIN offsets both in encrypted and clear form suitable for the preparation of bank cards.
3. Create a formatted PIN block from a customer entered clean PIN and encrypt the PIN block with a supplied PIN encrypting key.
4. Translate PINs from encipherment under a first encrypting key (PEK1) to encipherment under a different second encrypting key (PEK2).
5. Reformat PINs from one PIN block format to another PIN block format. But provide a controlling mechanism so that some translations are permitted and some can be denied.
6. Verify PINs using one or more algorithms (i.e., do the comparison using a clear customer entered PIN and a clear system generated PIN).
7. Verify PINs using a database of encrypted PINs (i.e., do the comparison using an encrypted customer entered PIN and an encrypted system stored PIN).

PINs Versus Keys, a Comparison

PINs are uniquely different from keys in several respects, which makes PIN management uniquely different from key management.

PINs, typically 4 digits in length, have far fewer combinations than do 56 bit keys. Consequently, PINs are particularly susceptible to dictionary attacks. In such an attack, the system interfaces and cryptographic instructions are manipulated to construct a dictionary of clear and encrypted PINs, where the PINs are stored in a single PIN block format and are encrypted under a fixed PIN encrypting key. If an intercepted encrypted PIN can be reformatted and translated to encryption under the same PIN encrypting key, then the unknown clear PIN value can be easily deduced by locating its encrypted value in the dictionary. With 4 digit PINs, the processing and storage requirements to carry out such an attack are negligible. However, since keys have $2^{**}56$ combinations, they are not susceptible to the same sort of dictionary attack. PINs are stored and transmitted in PIN blocks consisting of 16 decimal digits (or 8 bytes). Several PIN block formats have been standardized or have become industry-accepted de facto standards. They include:

ANSI 9.8
ISO FORMAT 0
VISA FORMAT 1 (least significant account number)
VISA FORMAT 4 (most significant account number)
IBM 4736
ECI FORMAT 1
ISO FORMAT 1
ECI FORMAT 4
VISA FORMAT 2
VISA FORMAT 3 (PIN can only be 4 digits)
IBM ENCRYPTING PIN PAD (4704 EPP)
IBM 3624
IBM 3621 and 5906
ECI FORMAT 2
ECI FORMAT 3
ANSI 9.8x
IBM NON-ENCRYPTING PIN PAD
DIEBOLD, DOCUTEL, NCR
BURROUGHS A significant portion of PIN processing consists of PIN block creation, reformatting from one PIN block format to another, and PIN recovery (extracting the PIN from the PIN block). On the other hand, keys are always stored as 64 bits, consisting of 56 independent key bits and 8 bits that can be used for parity. Unlike PIN management, which must recognize several PIN block formats, key management processes keys in only one format.

In simple terms, PINs exist so that they can be verified. Keys can also be verified, but their primary reason for existence is to provide confidentiality and integrity to data (and keys) via cryptographic means. Several industry-accepted PIN Verification Algorithms are available for authenticating PINs.

PINs appear in clear form at the point of entry to the system (i.e., when a PIN related transaction is requested) and when generated for the purpose of issuing PIN mailers. Personal keys may appear in clear form at the entry point to the system, but system keys will appear in clear form at the entry point only during installation. Thus, PINs and keys are managed differently.

PINs Versus Data, a Comparison

PINs are an integral part of the EFT and POS financial transactions, and must be used in accordance with a pre-established agreement which defines the liability imposed on each party to the agreement for loss of money resulting from a discovered PIN. Consequently, once encrypted, the PIN is never decrypted. All PIN verification is performed with the encrypted PIN, or with the clear PIN inside the secure boundary of the cryptographic facility.

Data, on the other hand, is encrypted by a sender (device or application program) and decrypted by a receiver (device or application). Otherwise, received data would be of no use. This defines a fundamental difference in the management of PINs and the management of data.

PIN Security and PIN Processing

It is important to recognize that PINs have their own unique security and processing requirement, distinct from keys and data.

Options are needed for both system specified and user specified PINs. Standards exist which define PIN block formats, to which the implementer must conform. Proprietary modes of PIN processing also exist. Extra defenses are necessary to prevent electronic speed attacks which can accumulate a dictionary of clear and encrypted PINs.

It is important for new equipments and methods for managing and handling PINs to be compatible with existing equipments and methods for managing and handling PINs. However, new equipments can offer enhanced PIN security without jeopardizing compatibility with existing equipments.

Prior art methods for handling various PIN formats and providing compatibility with clear PIN interfaces have been inadequate from security, complexity, and useability standpoints. With the proliferation of PIN formats, methods to associate PIN format to PIN encrypting key for cryptographic separation have become unwieldy. Methods to associate PIN Verification algorithm to PIN generating key for cryptographic separation have likewise become complex and unmanageable. PIN format translation has been inadequately controlled to prevent conversions from PIN formats of a given cryptographic strength to ones of lesser strength. Compatibility with older systems employing clear PIN interfaces has been been satisfied with similar clear PIN interfaces which expose systems to attack wherein clear PIN inputs permit construction of dictionaries of clear and encrypted PINs. Furthermore, prior art methods to cryptographically separate clear and encrypted PIN interfaces have been inadequate from a system complexity and useability standpoint. Prior art methods do not provide the security administrator with flexible, secure methods for configuring the PIN processing systems to support compatibility requirements.

OBJECTS OF THE INVENTION

It is an object of the invention to provide an improved method of cryptographic PIN processing.

It is another object of the invention to provide an improved method of cryptographic PIN processing which is more flexible than in the prior art.

It is another object of the invention to provide an improved method of cryptographic PIN processing which controls the use of clear PIN interfaces in accordance with a security policy established by the system manager.

It is another object of the invention to provide an improved method of cryptographic PIN processing which restricts the translation of PINs from one format to another format based on the security policy established by the system manager.

It is another object of the invention to provide a method of cryptographic PIN processing which builds into the storage of a PIN encrypting key the authority to encrypt a selected PIN block format.

It is another object of the invention to provide an improved method of cryptographic PIN processing which builds into the storage of a PIN generating key the authority to use that key with a selected PIN verification algorithm.

SUMMARY OF THE INVENTION

These and other objects, features and advantages are accomplished by the invention disclosed herein. Cryptographic PIN processing is achieved in an improved manner by associating control vectors with the PIN generating (verification) keys and PIN encrypting keys which provide authorization for the uses of the keys intended by the originator of the keys. The originator may be the local cryptographic facility (CF) and a utility program under the control of a security administrator, or the originator may be another network node which uses the key management methods described in the above-referenced copending patent applications to distribute said keys.

Among the uses specified by the control vector are limitations on the authority to use the associated key with certain PIN processing instructions, such as PIN generation, verification, translation and PIN block creation. Furthermore, the control vector may limit the authority of certain instructions to process clear PIN inputs (such as in PIN verification). The control vector may contain information identifying and, possibly restricting, PIN processing to a particular PIN format or particular processing algorithm.

The control vector implementation provides a flexible method for coupling format, usage, and processing authorization to keys. The system administrator can exercise flexibility in changing the implementation of his security policy by selecting appropriate control vectors in accordance with the invention. Furthermore, a method is provided for the security administrator to restrict certain PIN format translations.

The control vector implementation also provides an improved level of security by isolating clear and encrypted PIN processing and by coupling PIN formats to generating and encrypting keys.

BRIEF DESCRIPTION OF THE FIGURES

These and other objects, features and advantages of the invention will be more fully appreciated with reference to the accompanying figures.

FIG. 6 is the control vector format for PIN-Encrypting Keys.

FIG. 7 is the control vector format for PIN-Generating Keys.

DESCRIPTION OF THE BEST MODE FOR CARRYING OUT THE INVENTION

Reference is made to the copending patent application by S. M. Matyas, et al, referred to above for an overall description of the principles underlying the invention disclosed herein.

Cryptographic PIN processing is achieved in an improved manner by associating control vectors with the PIN generating (verification) keys and PIN encrypting keys which provide authorization for the uses of the keys intended by the originator of the keys. The originator may be the local cryptographic facility (CF) and a utility program under the control of a security administrator, or the originator may be another network node which uses the key management methods described in the above referenced copending patent application to distribute said keys.

Among the uses specified by the control vector are limitations on the authority to use the associated key with certain PIN processing instructions, such as PIN generation, verification, translation, and PIN block creation. Furthermore, the control vector may limit the authority of certain instructions to process clear PIN inputs (such as in PIN verification). The control vector may contain information identifying and, possibly restricting, PIN processing to a particular PIN format or particular processing algorithm.

The control vector implementation provides a flexible method for coupling format, usage, and processing authorization to keys. The system administrator can exercise flexibility in changing the implementation of his security policy by selecting appropriate control vectors in accordance with the invention. Furthermore, a method is provided for the security administrator to restrict certain PIN format translations.

The control vector implementation also provides an improved level of security by isolating clear and encrypted PIN processing and by coupling PIN formats to generating and encrypting keys.

The following are some of the PIN processing instructions and the salient security features provided by the control vector implementation.

1. Create PIN Block

Figure 8:
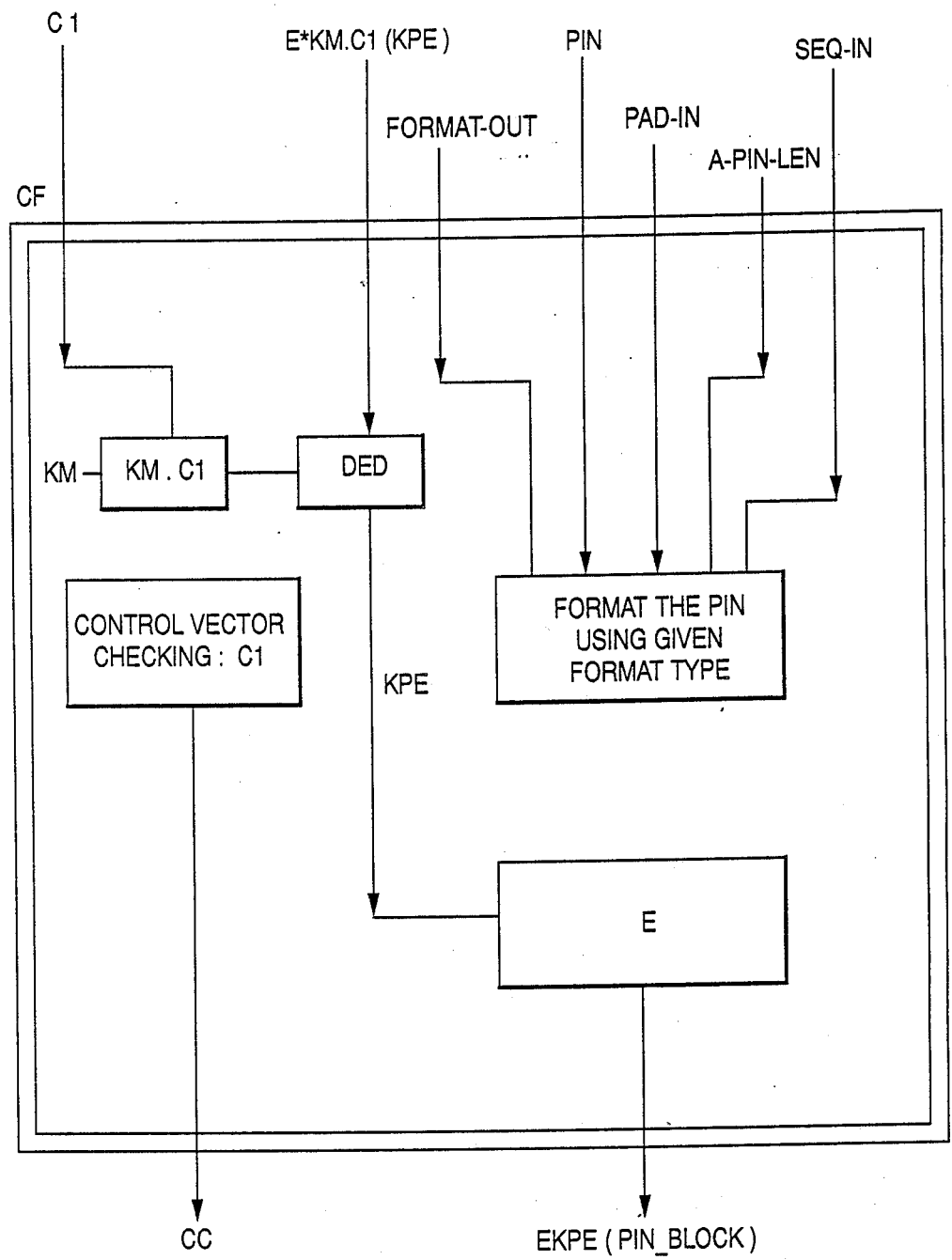
FIG. 8 is a block diagram of the Create Pin Block instruction.

The create PIN block (CPINB) instruction illustrated in FIG. 8, creates a PIN block in one of several possible PIN block formats and encrypts the PIN block with a specified PIN encrypting key. The PIN block is created from a clear PIN and, as necessary, other user or system specific data specified as inputs to the CPINB instruction.

2. Generate IBM 3624 PIN

Figure 9:
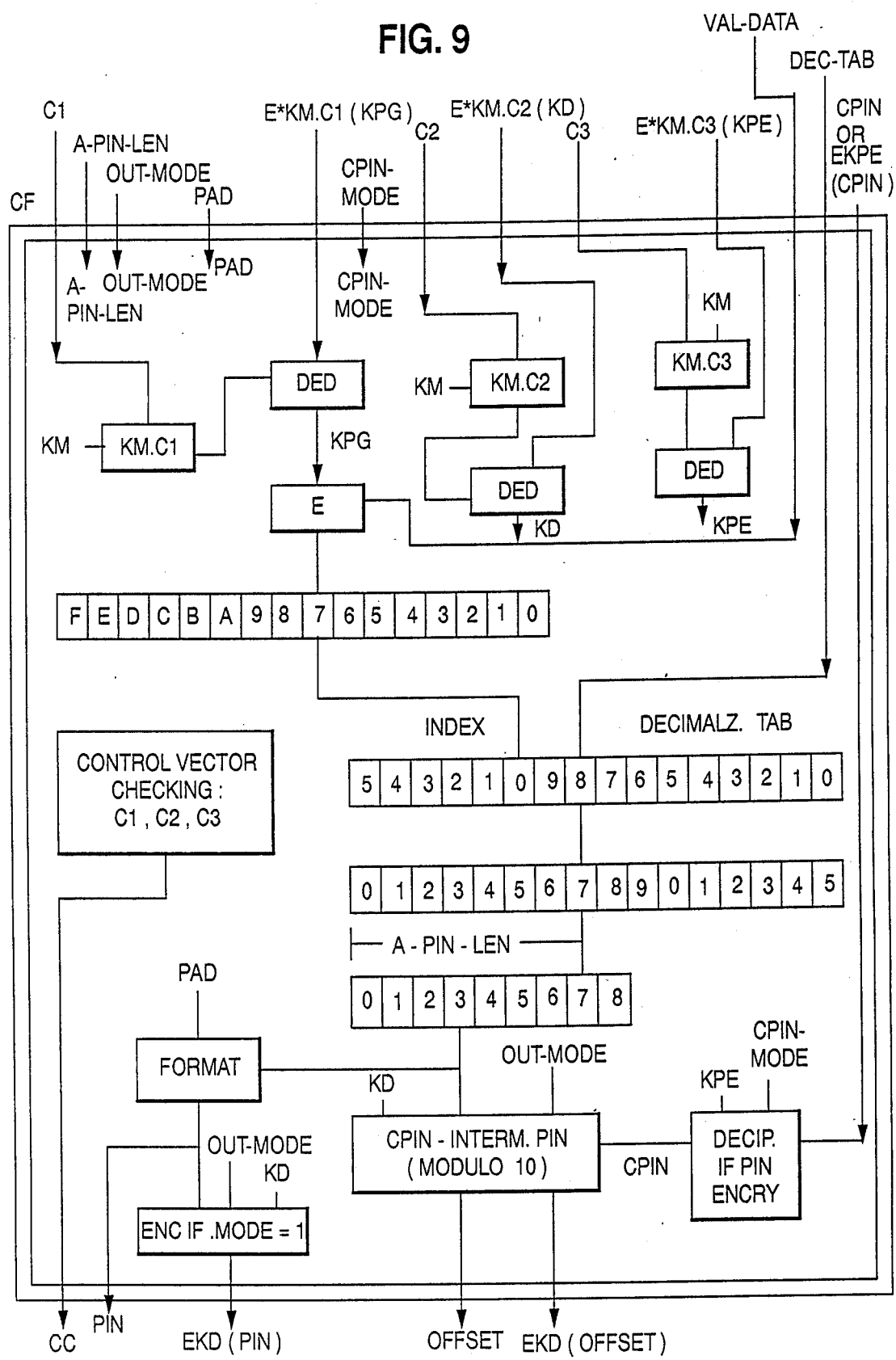
FIG. 9 is a block diagram of the Generate IBM 3624 PIN instruction.

The generate PIN (GPIN) instruction illustrated in FIG. 9 produces a formatted PIN block from a generated PIN or a PIN offset from a generated PIN and a specified customer-selected PIN. The GPIN instruction generates PINs using one of several possible PIN generation algorithms. The desired PIN generation algorithm is specified via a parameter input to the GPIN instruction. Each PIN generation algorithm generates PINs from a common, secret PIN generating key and other user-, system-and algorithm-specific data supplied as inputs to the GPIN instruction.

3. Verify IBM 3624 PIN

Figure 10:
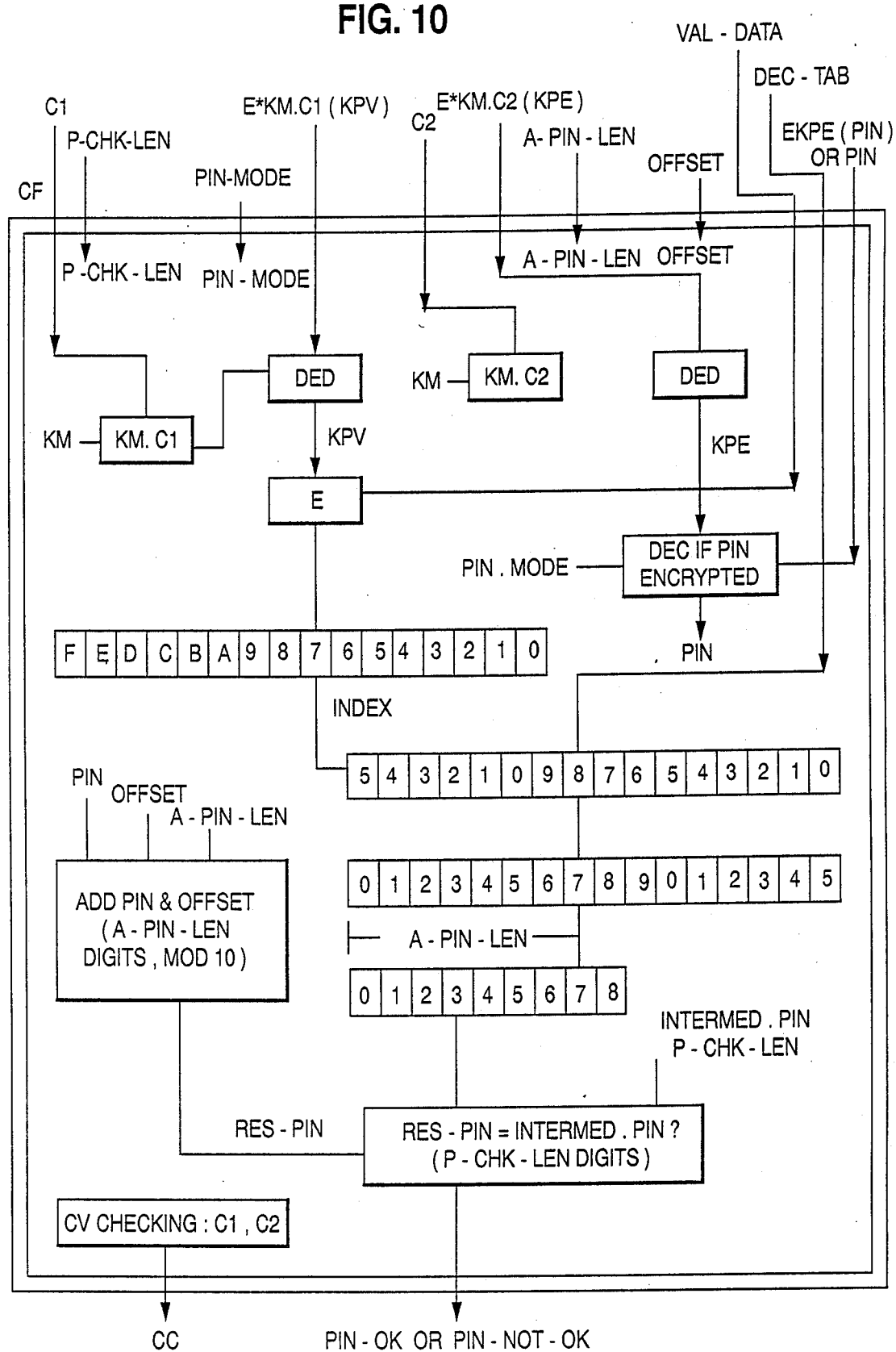
FIG. 10 is a block diagram of the Verify IBM 3624 PIN instruction.

The verify PIN (VPIN) instruction illustrated in FIG. 10, produces a 1 (yes) or 0 (no) indicating whether a specified input PIN is equal to an internally generated PIN. The VPIN instruction supports both clear and encrypted modes for the input PIN, although these modes can be further restricted via the control vector of the PIN generating key. The input PIN is always formatted and must conform to the allowed PIN block formats permitted by the VPIN instruction. When encrypted, the PIN block is encrypted using a PIN encrypting key. Internally, the VPIN instruction generates PINs using one of several possible PIN generation/verification algorithms. The desired PIN generation/verification algorithm is specified via a parameter input to the VPIN instruction. Each PIN generation/verification algorithm generates PINs from a common, secret PIN generating key and other user-, system-and algorithm-specific data supplied as inputs to the VPIN instruction.

4. PIN Translate

Figure 11:
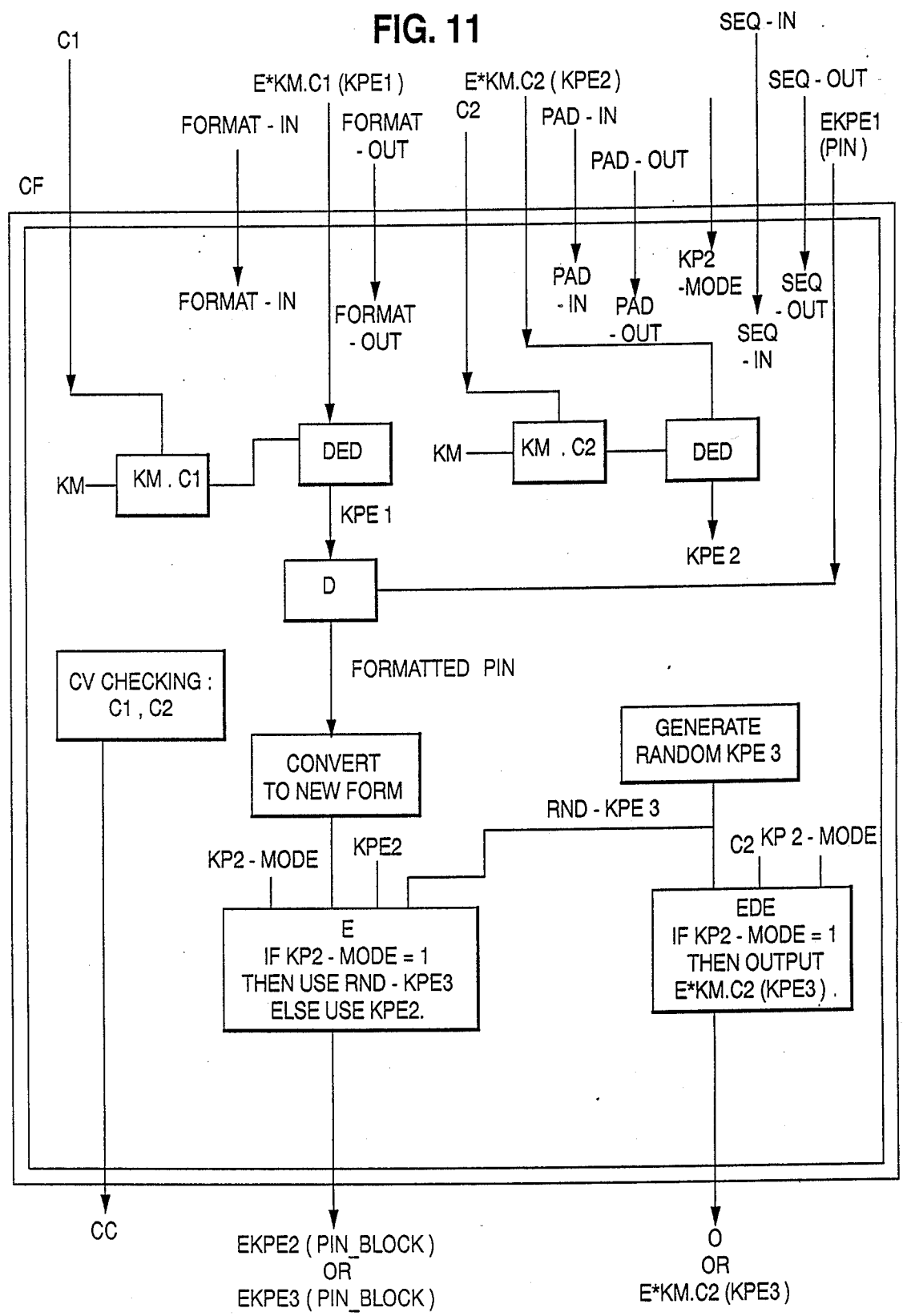
FIG. 11 is a block diagram of the PIN Translate instruction.

The PIN translate (PINT) instruction illustrated in FIG. 11 causes an input formatted PIN block enciphered under a first PIN encrypting key to be reenciphered under a second PIN encrypting key, or to be reformatted to a different PIN block format and then encrypted under the same PIN encrypting key, or to be reformatted to a different PIN block format and then reencrypted under a second PIN encrypting key.

Figure 12:
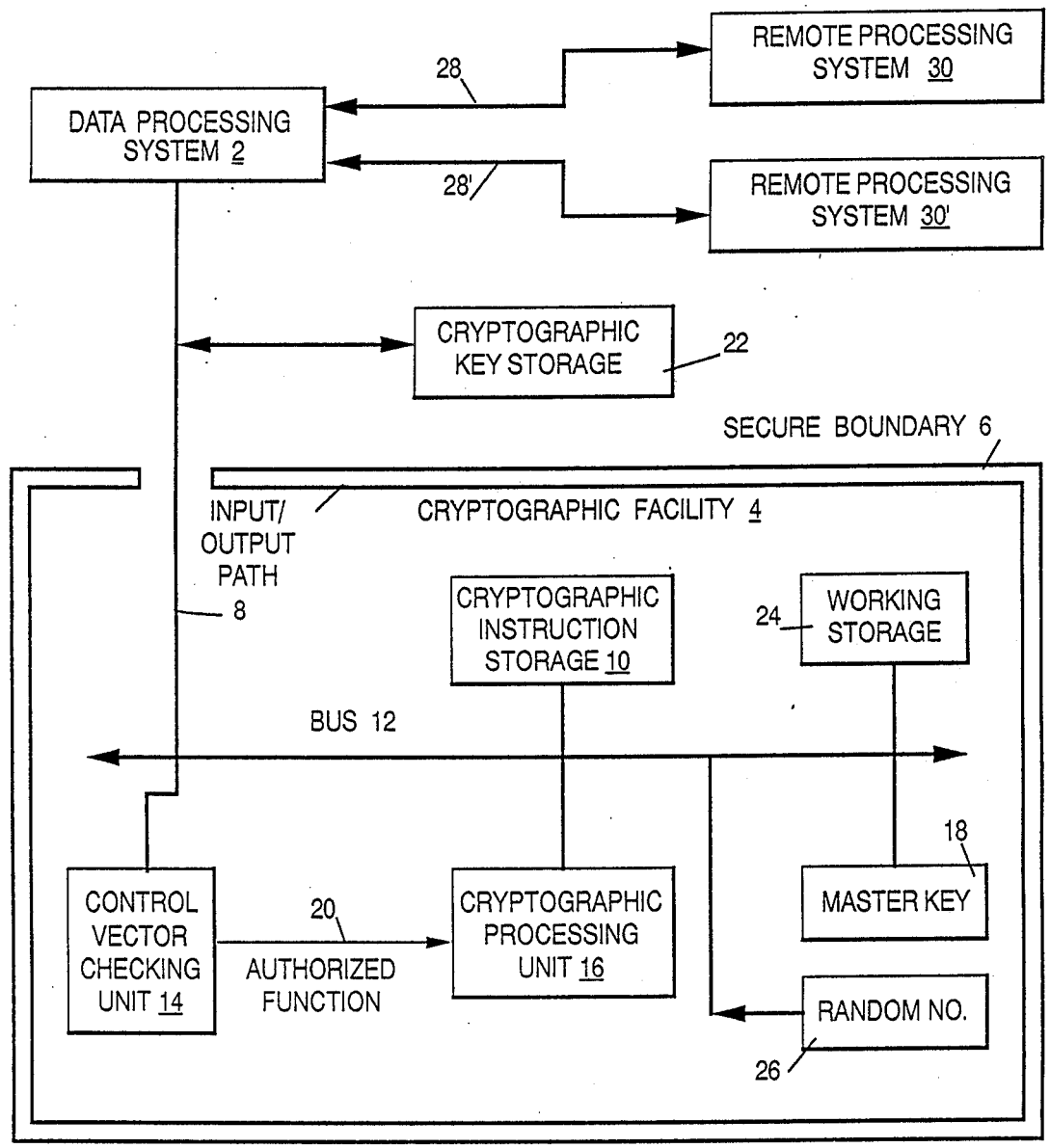
FIG. 12 is a block diagram of the data processing system with the cryptographic facility.

FIG. 12 gives a block diagram representation of the data processing system with the cryptographic facility therein. In FIG. 12, the data processing system 2 executes a program such as crypto facility access programs and application programs. These programs output cryptographic service requests for PIN management using cryptographic keys which are associated with control vectors. The general format for a control vector is shown in FIG. 6. Control vectors define the function which the associated key is allowed by its originator to perform. The cryptographic architecture invention herein is an apparatus and a method for validating that PIN processing functions requested for a cryptographic key by the program, have been authorized by the originator of the key.

As is shown in FIG. 12, contained within or associated with the data processing system 2 is a cryptographic facility 4 which is characterized by a secure boundary 6. An input/output path 8 passes through the secure boundary 6 for receiving the cryptographic service request, cryptographic keys and their associated control vectors from the program. The input/out path 8 outputs responses to those cryptographic requests from the cryptograhic facility. Included within the secure boundary 6 is a cryptographic instruction storage 10 which is coupled by units of the bus 12 to the input/output path 8. A control vector checking units 14 is coupled to the instruction in storage 10 and a cryptographic processing units 16 is also coupled to the instruction storage 10. A master key storage 18 is coupled to the cryptographic processing unit 16. The cryptographic facility 4 provides a secure location for executing PIN processing functions in response to the received service request.

The cryptographic instruction storage 10 receives over the input/output path 8 a cryptographic service request for performing a PIN processing function with a cryptographic key. The control vector checking unit 14 has an input coupled to the input/output path 8, for receiving a control vector associated with the cryptographic key. The control vector checking unit 14 also has an input connected to the cryptographic instruction storage 10, for receiving control signals to initiate checking that the control vector authorizes the key management function which is requested by the cryptographic service request.

The control vector checking unit 14 has an authorization output 20 which is connected to an input of the cryptographic processing unit 16, for signalling that PIN processing function is authorized, the receipt of the authorization signal by the cryptographic processing unit 16 initiates the performance of the requested PIN processing function with the cryptographic key. A cryptographic key storage unit 22 is coupled to the cryptographic facility 14 over the input/output path 8. The cryptographic key storage unit 22 stores the cryptographic key in an encrypted form in which the cryptographic key is encrypted under a storage key which is a logical product of the associated control vector and the master key stored in the master key storage 18.

An example of recovering an encrypted key from the cryptographic key storage 22 occurs when the cryptographic instruction storeage 10 receives over the input/output path 8 a cryptographic service request for recovering the cryptographic key from the cryptographic key storage units 22. The control vector checking unit 14 will then output in response thereto, an authorization signal on line 20 to the cryptographic processing unit 16 that the function of recovering the cryptographic key is authorized. The cryptographic processing unit 16 will then operate in response to the authorization signal on line 20, to receive the encrypted form of the cryptographic key from the cryptographic key storage 22 and to decrypt the encrypted form under the storage key which is a logical product of the associated control vector and the master key stored in the master key storage 18.

The storage key is the exclusive-OR product of the associated control vector and the master key stored in the master key storage 18. Although the logical product is an exclusive OR operation in the preferred embodiment, it can also be other types of logical operations.

The associated control vector, whose general format is shown in FIG. 6, is stored with the encrypted form of its associated cryptographic key in the cryptographic key storage 22. Since all keys stored on a cryptographic storage encrypted under the master key, a uniform method for encryption and decryption of encrypted keys thereon can be performed.

The associated control vector, whose general format is shown in FIG. 6, includes fields defining the authorized types of cryptographic functions, including key management functions, data encryption/decryption functions and personal identification numbers (PIN) processing functions. In the PIN processing applications, the PIN processing functions type is designated for the type field. The associated control vector also includes additional fields which can define export control for the keys and associated encrypted information and the usage of the keys and associated encrypted information.

Notation - The following notation is used herein:
| | |
|---|---|
| ECB | Electronic code book |
| CBC | Cipher block chaining |
| KM | 128 bit Master key |
| KEK | 128 bit Key encrypting key |
| K | 64 bit key |
| *K | 128 bit key |
| (*)K | 64 or 128 bit key |
| KD | 64 bit data encrypting key |
| KK | 64 bit Key encrypting key |
| *KK | 128 bit Key encrypting key |
| KKo | offset 64 bit Key encrypting key |
| *KKo | offset 128 bit Key encrypting key |
| (*)KKo | offset 64 or 128 bit Key encrypting key |
| *KKNI | 128 bit partial notarizing Key encrypting key |
| *KN | 128 bit notarizing key, equivalent to *KKNIo |
| cx | 64 bit control vector |
| CxL | 64 bit left control vector |
| CxR | 64 bit right control vector |
| XOR or xor | exclusive or operation |
| or | logical or operation |
| X '0' | Hex notation |
| 11 | concantentation operation |
| [x] | optional parameter x |
| not = | not equal |
| E or e | single encryption |
| D or d | single decryption |
| EDE or ede | triple encryption |
| DED or ded | triple decryption |
| Equations | The function of each instruction is mathematically denoted in the form: I1, I2, I3, I4,... --- 01, 02, 03,... where I1, I2, I3,... are the inputs to the function and 01, 02, 03,... are the outputs from the function. |
| KM.Cx | (KML XOR Cx) 11 (KMR XOR Cx) = KMY 11 KMX where, KML = Left 64 bits of the master key KM, KMR = right 64 bits of the master key KM, KMY = KML XOR Cx KMX = KMR XOR Cx |
| e*KM.Cx(key) | e*KM.Cx(key) = eKMY(dKMX(eKMY(key))) where, KMY = KML XOR Cx KMX = KMR XOR Cx key = 64 bit key |
| e*KEKn.CX(key) | e*KEKn.Cx(key) = eKEKY(dKEKX(eKEKY(key))) where, KEKY = KEKnL XOR CxL KEKX = KEKnR XOR CxR key = 64 bit key |
| e*KM.CxL(KEKnL)e*KM.CxL(KEKL) = eKMY)dKMX(eKMY(KEKnL))) | where, KEKL = left 64 bits of KEK KMY = KML XOR CxL KMX = KMR XOR CxL |
| e*KM.CxR(KEKnR)e*KM.CxR(KEKR) = eKMY(dKMX(eKMY(KEKnR))) | where, KEKR = right 64 bits of KEK KMY = KML XOR CxR KMX = KMR XOR CxR |
| e*KEKo(key) | e*KEKo(key) = eKEKLo(dKEKRo(eKEKLo(key)) where, KEKLo = KEKL XOR cntr KEKRo = KEKR XOR cntr cntr = implicit 64-bit key-message counter for KEK key = 64 bit key |

Cryptographic Separation of Keys

Keys are separated cryptographically by the invention according to key type and key usage attributes.

1. The architecture guarantees that cryptographic keys can be used only in the way or ways prescribed and intended.

2. Internal Versus On-The-Link Separation. Internally (i.e., within the cryptographic facility), keys are separated via control vectors or other appropriate/equivalent mechanism. On the link, keys are separated using control vectors.

3. Hardware Versus Software Enforcement. Certain cryptographic separation is implemented in hardware; other cryptographic separation can be implemented via software.

4. Control vector key types and compatibility-mode key types. In order that the compatibility-mode key types will not diminish the security, certain rules governing generation, distribution, and usage of these two classes of key types is imposed.

5. A list of required key separations provided by the invention is listed below:

(a) Data Privacy. ENCIPHER from DECIPHER, allows public key protocols such as mailbox, ballot and pass on.
(b) Data MAC. MACGEN from MACVER, allows for non-repudiation (equivalent of electronic signature).
(c) Data XLATE. Allows a secure translate channel to be established, where intermediate devices cannot decrypt encrypted data.
(d) Data COMPAT. Allows compatibility mode without weakening security of other data keys.
(e) Data ANSI. Allows ANSI X9.17 key management to be coexist with non-ANSI X9.17 key management without loss of security to either approach.
(f) Key Encrypting Keys. KEK Sender from KEK Receiver.
(g) PIN Keys. PIN Generating Key from PIN Encrypting key.

Pin Keys Separation

The justifications for the separation are given below:
1. A—PIN Generating Keys: PIN Encrypting Keys
   An insider who could cause a PIN block to be forced equal to a valid ID value and then encrypted under a PIN generating key instead of a PIN encrypting key, could expose PINs.
2. B—Generate PIN function: Encipher PIN function
   During PIN generation, the Encipher PIN attribute allows separation of PIN Generating keys that allow clear PINs to be generated from those that always must output encrypted PINs.
3. C—Create PIN Block & Generate PIN: Reformat PIN, Verify PIN & Xlate PIN
   Permits the PIN encrypting key to be used with routine PIN processing functions like Reformat PIN, Verify PIN and Xlate PIN without allowing PIN keys to be used or create or otherwise "introduce" PINs into the network at electronic speeds. This would prevent dictionaries of plain and encrypted PINs to be collected at electronic speeds, which would be useful in attacking and recovering PINs without directly deciphering them. Tight control needs to be enforced over where and when and under what conditions PINs may be introduced into the system.
4. D—Create PIN Block: Generate PIN
   Greater control can be exercised over the introduction of PINs into the network. A node with a requirement to create PIN blocks need not necessarily have a right or need to generate PINs.
5. E—Reformat PIN and Verify PIN: Xlate PIN
   Greater control can be exercised over the PIN processing functions in the network. A node with a need and right to translate PINs does not necessarily have a right or need to reformat a PIN or verify a PIN. The later two functions might be used in combination to exhaust PINs via an internal attack, whereas the Xlate PIN function could be used by some nodes without giving away full processing capabilities.

Control Vectors

Control Vectors Concept

The control vector is a 64 bit nonsecret cryptographic variable for controlling the usage of keys. Each key K defined to the cryptographic system has an associated control vector C, i.e., the key and control vector define a tuple (K, C).

Each control vector specifies a CV TYPE, which broadly defines how the key may be used and the rules governing how that key may be communicated on the link. A key may be a data key, sender key encrypting key, receiver key encrypting key, PIN encrypting key, PIN generating key, Intermediate ICV, Key part or Token. Additional bits in the control vector specify exactly in which cryptographic instructions and parameter inputs the key may operate. Still other bits control the export of the key, i.e., whether the key can be exported or not.

The control vector is coupled cryptographically to the key via a special encryption function. For example, when the K is stored in a Key Storage, K is encrypted under a key formed by Exclusive-ORing the control vector with the master key, i.e., K is stored as the tuple (eKM.C(K), C), where KM.C denotes KM xor C. When K is transmitted on the link (from one device to another), a similar encrypted form is used. In this case, the master key KM is replaced by a key encrypting key KEK, where KEK is a key shared between the sender and receiver. Thus, K is transmitted as the tuple (eKEK.C(K), C). The architecture does not require that the control vector be stored or transmitted with the key in situations where its value is defined implicitly from the context or can be reconstructed from available key-related information.

Since the control vector (C) is tightly coupled to the key (K), via the encrypted form eKM.C(K) or eKEK.C(K), it is apparent that K cannot be recovered from its encrypted form unless C is correctly specified. Thus, if the tuple (EKM.C(K), C) is provided as an input to a requested cryptographic instruction, the cryptographic facility will first check the supplied value of C to determine that the requested usage of the key is permitted. Only then will C be used to decrypt eKM.C(K) to recover the clear value of K internal to the cryptographic facility. If a false value C* is specified, the cryptographic facility may be fooled temporarily into accepting C*, but K will not be recovered properly. Thus, there is no opportunity for a user to recover the correct value of K unless the correct value of C is also specified. The cryptographic principle is thus the basis upon which the entire architecture is built; and additional security is provided as necessary and where appropriate.

The control vector is a compact data structure for defining the usage attributes of a cryptographic key. The control vector is cryptographically coupled to the key via an encryption process. This process is such that the key can be decrypted properly only if the control vector is correctly specified. (Even a signal bit change in the control vector will cause an entirely different key to be recovered.)

CV CHECKING

The control vector is designed to minimize CV checking. Control vector usage bits are defined and structured so that each usage attribute, by itself, grants or denies a specific usage. Thus, the capability to encipher data via the Encipher Data instruction is controlled via a single "Encipher" bit within the control vector whose type/subtype is "data/privacy".

Thus, each usage attribute is defined independently from all other usage attributes. This guarantees a CV checking process such that each instruction checks only the usage attributes called for by the requested function. A design wherein usage attributes are enabled only when certain other attributes are enabled or disabled is specifically avoided, since this increases CV checking. Some cross checking of attributes among two or more control vectors is required, but is kept to a minimum.

To facilitate and simplify CV checking, each cryptographic instruction, where necessary, is passed a "mode" parameter declaring a specified use of the key or keys passed as parameters to the instruction. Thus, the CV checking process tests each control vector according to the specified "mode". This eliminates costly cross checking among control vector attributes to ensure consistency. The design also follows a principle that no cryptographic instruction generates a control vector. All control vectors are supplied to the cryptographic instructions as parameter inputs.

Where possible, like usage attributes and field definitions are located at the same bit positions in the control vector, regardless of CV type. This facilitates CV checking. For example, the translate ciphertext instruction interrogates the same bit positions in the data/privacy and the data/xlate control vectors, even though the usage bits are "E" and "D" for the data/privacy CV and "XOUT" and "XIN" for the data/xlate CV, respectively.

CV STRUCTURE

In general, the control vector structure (including formats, field and bit assignments) has been defined to minimize and to facilitate CV checking, while at the same time providing cryptographic security. The CV structure, so to speak, is the variable with the greatest degree of freedom in the design process.

The following design options have been employed in the control vector:

1. Vertical Separation. The control vector has a "CV Type" field that provides vertical separation within the control vector structure, much like the separation provided by variants. Control vector types are defined along intuitive lines, following existing key terminology and key management. However, vertical separation is implemented only where necessary under the CA, thus ensuring architectural simplicity and of ease of comprehension of the CV checking rules.

By first defining broad classes of CV Main Types (e.g. Data Keys, Key Encrypting Keys, PIN Keys) and then further defining CV Subtypes and usage attributes within CV Type, the CV checking rules can be optimized much in the same way that a "divided and conquer" search can be employed more effectively than a brute force approach.

2. Horizontal Separation. The control vector is ideally suited as a data structure for recording the usage attributes to be associated with a key (or other cryptographic variable). Within the CA, this is accomplished by specifying a bit in the control vector for every cryptographic instruction (or key parameter within the instruction, if more than one key parameter may participate) where the key may be used as an input. A bit value of "1" signifies that a usage of the key is "enabled" by the CF whereas a bit value of "0" signifies that a usage of the key is "disabled" by the CF. This form of control vector structuring is called horizontal separation.

3. Encoded Fields. A field of two or more bits is sometimes encoded for reasons of security. An encoded field has the property that individual bits have no significance by themselves, but the bits together define a set of possible values. Encoded fields have the advantage that they define mutually exclusive events since the field can take on only one value at a time. Encoded fields have the potential disadvantage that CV checking is not always optimized from a performance standpoint. However, encoded fields are sometimes necessary to ensure that usage attributes cannot be mixed in inappropriate combinations that give rise to cryptographic attack or introduce some cryptographic weakness.

4. Protection From Non-System Generated Keys. The method for coupling the control vector and key is such that CV checking is unable to detect a system generated key (via KGEN or GKS) from a non-system generated key. For this reason, a "back-door" method exists within the architecture for generating a keys and control vectors. It consists of defining a control vector "of choice" and a random number which is then represented as a key encrypted in the manner described under the architecture using the selected control vector. (However, the method has no capability to control the key actually recovered within the cryptographic facility.)

The so-called "back-door" method of key generation is primarily an annoyance, although in some cases cryptographic attacks would be possible if additional measures of defense were not taken in the architecture. It would be a simple matter to define an architecture that eliminates this "back-door" key generation (once and for all), but doing so would introduce additional unwarranted complexity and processing. A more practical approach is followed by the CA, viz., the "back-door" key generation problem is prevented only where necessary for security reasons. Thus, a good balance among security, complexity, and performance is achieved. Techniques to avoid cryptographic weaknesses introduced by the "back-door" method of key generation are these:

(a) Where necessary, conflicting usage attributes within a single control vector are split among two control vectors. The GKS instruction has checking that prevents so-called bad combinations of key pairs from being generated.

(b) Where necessary, conflicting usage attributes within a single control vector are grouped into a single encoded field.

(c) As a last resort, extra redundancy is used so that the CF can validate its own system generated keys.

5. Even Parity for Control Vectors. Even parity is enforced on the control vector. This ensures that the Exclusive-OR of an odd parity key with the control vector will result in an internal key of odd parity. This, in turn, ensures compatibility with hardware that may check such internally derived keys for odd parity (if such checking is enforced). Saying it another way, the CA cannot ensure that hardware will not enforce this odd parity on internal keys.

A control vector of 64 bits, numbered 0 through 63. The most significant bit is bit 0, by convention. Of the 64 bits, there are 8 parity bits.

6. Anti-Variant Bits. This guarantees cryptographic separation between variants and control vectors, which may unavoidably be mixed in some implementations internal to a node.

7. Avoid Onto Mappings. The control vector design and the manipulation of the control vector via the cryptographic instruction set avoids instances where CV fields with multiple values are mapped into a single value. Some specific instances of such onto mappings are allowed (e.g., LCVA, RFMK, and RTMK instructions) where security is not jeopardized.

Control Vector Format for PIN Keys

PIN keys are divided into the following subtypes:
(a) PIN-encrypting keys (PEKs)
  These are the keys that are used to encrypt PINs.
(b) PIN-generating keys (PGKs)
  These are the keys that are used to generate PINs. In some cases, the PGKs are also called PIN validating keys since they are used to validate/verify PINs.

Control Vector for PIN-Encrypting Keys

Refer to FIG. 6. The following is a detailed description of each field and subfield of this figure.
CV TYPE
  CV TYPE=B'0010000' for PIN-encrypting key (PEK) (maintype="PIN key"=B'0010', subtype="PIN-encrypting key"=B'000')
EXPORT CONTROL—This field occupies 1 bit:
  EXPORT CONTROL=1: This key can be exported by RFMK. Also, the RFMK, RTMK and LCVA instructions can reset this bit to 0.
  EXPORT CONTROL=0: This key cannot be exported by RFMK. Also, it cannot be changed to 1 by any instruction.
USAGE
(a) CREATE PINBLK
  CREATE PINBLK=1: This key is allowed to encipher the PIN Block in the CREATE PIN BLOCK instruction.
  CREATE PINPBL=0: This key is not allowed to encipher the PIN Block in the CREATE PIN BLOCK instruction.
(b) GENPIN
  GENPIN=1: This key is allowed to encrypt the input customer PIN (CPIN) in the GENERATE PIN instruction.
(c) VERPIN
  VERPIN=1: This key is allowed to decrypt the encrypted PIN input to the VERIFY PIN instruction.
  VERPIN=0: This key is not allowed to decrypt the encrypted ½ IN input to the VERIFY PIN instruction.
(d) XPIN in
  XPIN in=1: This key is allowed to decrypt the encrypted input PIN in the TRANSLATE PIN instruction.
  XPIN in=0: This key is not allowed to decrypt the encrypted input PIN in the TRANSLATE PIN instruction.
(e) XPIN out=1: This key is allowed to encrypt the output PIN in the TRANSLATE PIN instruction.
  XPIN out=0: This key is not allowed to encrypt the output PIN in the TRANSLATE PIN instruction.

AV (Anti-Variant)
This field differentiates any valid control vector from the 64 predefined variants that are used in variant-based crypto systems. Since all 8 bytes of the any variant of the 64 predefined variants are the same, setting the value of the AV field such that at least two bytes of the control vector are not the same will differentiate a valid control vector from a predefined variant.

SOFTWARE bits
This field occupies 12 bits.
(a) CV VERSION
This field is 6 bits long and is used by CFAP to distinguish the current control vector definition from future definitions.
(b) Software-Enforced Usage
  None. This field indicates whether the control vector is a 64 bit control vector or an extended control vector of more than 64 bits.

RESERVED bits
This field is reserved for the system for future use. To facilitate the ease of future uses for this field, the hardware must check to make sure that the last 16 bits of this field are all zero. Other bits of this field may not be checked. Of the reserved bits, one byte (including parity) is specifically reserved for the future expansion of the CV TYPE field.

PARITY
This field consists of the last bit of every byte of the control vector. Every parity bit is the even parity of the preceding 7 bits of the byte.

Control Vector for PIN-Generating Keys

Refer to FIG. 7. The following is a detailed description of each field and subfield of this figure.
CV TYPE
  CV TYPE=B'0010000' for PIN-generating key (maintype="PIN key"=B'0010', subtype="PIN-generating key"=B'001')
EXPORT CONTROL
  EXPORT CONTROL=1: This key can be exported by RFMK. Also, the RFMK, RTMK and LCVA instructions can reset this bit to 0.
  EXPORT CONTROL=0: This key cannot be exported by RFMK. Also, it cannot be changed to 1 by any instruction.
USAGE
(a) GENPIN
  This field occupies 2 bits, indicating the conditions under which the key is allowed to generate PINs or PIN Offsets in the GENERATE PIN instruction.
  GENPIN=B'00': not allowed to generate PINs or PIN offsets.
  GENPIN=B'01': allowed to generate a clear PIN or clear PIN offset.
  GENPIN=B'10': allowed to generate an encrypted PIN or encrypted PIN offset.
  GENPIN=B'11': allowed to generate a clear or encrypted PIN, or a clear or encrypted PIN offset.
(b) GPIN
  This bit indicates whether the customer selected PIN (CPIN) can be input to the GENPIN instruction in the form of a clear PIN or an encrypted PIN.
  GPIN=0: Clear or encrypted PIN is allowed.
  GPIN=1: Only encrypted PIN is allowed
(c) VERPIN
  This bit indicates whether the key can be used as a PIN-validating key to verify PINs in the VERIFY PIN instruction.
  VERPIN=1: Allowed to be used to verify PINs.
  VERPIN=0: Not allowed to be used to verify PINs.
(d) VPIN
  This bit indicates whether the PIN to be verified in the VERIFY PIN instruction can be input to the instruction in the form of a clear PIN or an encrypted PIN.
  VPIN=0: Clear or encrypted PIN is allowed.
  VPIN=1: Only encrypted PIN is allowed.

AV (Anti-Variant)
    Same description as that of PIN-encrypting keys.

SOFTWARE bits
    This field occupies 12 bits.
(a) CV VERSION
    Same description as that of PIN-encrypting keys.
(b) Software-Enforced Usage
    None.

EXTENSION
    Same description as that of PIN-encrypting keys.

RESERVED bits
    Same description as that of PIN-encrypting keys.

PARITY bits
    Same description as that of PIN-encrypting keys.

Pin Processing Instructions

The PIN processing instructions are described in detail in the following sections. These instructions must be implemented within the cryptographic facility.

Create Pin Block (CPINB)

Equation:
e*KM.C1(KPE),PIN,format-out,
pad-in,seq-in,pan,a-pin-len,C1
—eKPE(PIN BLOCK)
Inputs:

| | |
|---|---|
| e*KM.C1(KPE) | KPE is the 64 bit PIN encrypting key triple encrypted under KM with a control vector C1 and used to encrypt the input PIN. |
| PIN | 1 to 16 decimal digits in clear. |
| format-out | 4 bit code indicating the PIN format to be used for the pin block.<br>0000: IBM 3624 format<br>0001: IBM 3621 format<br>0010: ANSI format<br>0011: 4704 format (encrypting key pad)<br>0100: Docutel, Diebold, NCR<br>0101: Burroughs<br>0110: ISO format<br>0111: not used<br>1XXX: not used |
| pad-in | This is a pad-in character, a 4 bit value from X'0] to X]F], to be used to format a PIN according to the PIN format. The pad character and the number of padding characters depend upon the type of format. |
| seq-in | A two byte Sequence number. If the PIN format requires only a one byte sequence number, then the least significant byte of seq-in will be used. Seq-in may or may not be required depending upon the format. |
| pan | Twelve 4-bit digits representing the "rightmost" least significant 12 digits of the primary account number. Pan may or may not be required depending upon the format. |
| a-pin-len | C1 is the control vector for the input pin encrypting key. |

Outputs:
eKPE(PIN BLOCK The formatted PIN Block encrypted under the pin encrypting key KPE.

Description: The Create PIN Block function is used to encrypt a clear PIN using input PIN encrypting key at ATMs or any other PIN input devices. The clear PIN is 1–16 decimal character input to the function, the PIN is formatted using the given format-out type and encrypted with KPE key. Now this formatted PIN can be sent to a verification node or any other intermediate node securely.

CC:
1. successful operation
2. C1 is in invalid
3. Unsuccessful operation (error).

Control Vector Checking:
1. Checking on C1
    cv type="PIN KEY/PEK"
    Create PINBLK usage bit=1
    reserved=X'0'

Generate IBM 3624 PIN (GPIN)

Equation:
e*KM.C1(KPG,[e*KM.C2(KD)]
e*KM.C3(KPE),out-mode,eKPE(CPIN,[CPIN]
dec-tab,val-data,a-pin-len,pad,cpin-mode,c1,[C2],C3
—PIN            (Out-mode=0)
—eKD(PIN)       (Out-mode=1)
—Offset         (Out-mode=2)
—eKD(Offset)    (Out-mode=3)

Inputs:

| | |
|---|---|
| e*KM.C1(KPG) | KPG is the 64 bit Pin generating key, triple encrypted under KM with a control vector C1. |
| e*KM.C2(KD) | KD is the 64 bit data key, triple encrypted under KM with a control vector C2 and used to encrypt the generated PIN or the generated Offset. This optional parameter must be provided for out-mode =1 or out-mode =3. |
| e*KM.C3(KPE) | KPE is the 64 bit Pin encrypting key, triple encrypted under KM with a control vector C3 and used to encrypt the customer PIN. |
| out-mode | Output mode indicates the form of output required.<br>0: Clear PIN output<br>1: eKD(PIN)<br>2: Offset<br>3: eKD(Offset) |
| eKPE(CPIN) | CPIN is a 64 bit (16 decimal coded digits), customer selected PIN. Used to generate the Offset, this is an encrypted form of the customer selected PIN under the PIN encrypting key. The default is encrypted customer selected PIN to this function. (CPIN is a formatted PIN in IBM 3624 format.) |
| CPIN | CPIN is a 64 bit (16 decimal coded digits), customer selected PIN in clear form. This optional input must be provided if cpin-mode = 0 is specified to the function. The clear customer PIN will be only permitted if the PIN generating key permits clear PINs to the function. The clear customer PINs are permitted by the CCA to be compatible with the existing system requirements. |
| dec-tab | Decimalization TABLE is a 64 bit plain input which represents 16 decimal digits to be used in the PIN generation process. |
| val-data | Validation data is a 64 bit plain user's data, padding included. Ordinarily it will be the user's PAN. |
| a-pin-len | a-pin-len is a 4 bit number (1-16) indicating how many digits of the generated PIN are assigned to the customer, and represents the number of digits in the intermediate PIN. |
| pad | This is a pad character, a 4 bit value from X'A' to X'F', to be used to format a PIN according to IBM 3624 PIN format. There could be 0-15 pad characters (16 - number of pin characters = pad characters). |
| cpin-mode | cpin-mode specifies whether a clear customer PIN or encrypted customer PIN is passed to the function. The control vector checking is enforced on the pin generating key to insure the security of using encrypted pins from the clear pins.<br>0: clear CPIN<br>1: encrypted CPIN |
| C1,C2,C3 | C1, C2 and C3 are the control vectors for KPG, KD and KPE respectively. C2 is an optional |

| | |
|---|---|
| | control vector which must be supplied if the output-type specified is either 1 or 3. |
| Outputs: | |
| PIN: | This is a 64 bit IBM 3624 formatted PIN output in the clear. Padding and formatting is done internal to the hardware. |
| eKD(PIN) | eKD(PIN) is the 64 bit formatted PIN encrypted under data key KD. Decipher data instruction can be used to decipher the PIN in some other node for PIN mailing purposes. (A secure PC can be used to decrypt these encrypted PINs and print for mailing). No decryption of PINs are allowed in the generating node. |
| Offset | Offset is a 64 bit data, representing 1-16 decimal digits, used by the PIN verification process if the PIN was user selected. The offset data reflects the difference between the PIN that is selected by the customer (denoted CPIN) and the PIN that is generated by the verification (denoted PIN). |

Description: The GPIN instruction generates an IBM 3624 formatted PIN from the validation data and a PIN generating key. Alternatively, the GPIN instruction can accept a customers selected PIN to generate the Offset; the customer selected PIN can be in the clear or encrypted form.

The PIN output can be in clear or in encrypted form. The output PIN is always formatted using the supplied padding character. The clear output can be used for printing a clear PIN distributed via a PIN mailer. The encrypted PIN or offset is provided to support decrypting capability at the PIN mailer stations. A secure PC can be used to decrypt PINs and Offset and print on the customer card.

The Offset outputs is in clear or encrypted form. The Offset is written on the customer's card, in addition to the other information. The Offset is generated by substracting intermediate PIN (length=assigned PIN length) from CPIN (length=16). The padding in the CPIN is preserved and propagated to Offset.

NOTE: The PIN generating keys and PIN verification keys refer to the same key. The different names are often used pending upon the usage of the key in the function.

CC:
1. successful operation
2. C1 or C2 or C3 is invalid
3. invalid pad character
4. invalid customer pin
5. invalid decimalization table
6. unsuccessful operation (error).

Control Vector Checking:
1. cv type="PIN KEY/PGK"
   If out-mode=0 or 2 then GENPIN='01' or '11'
   If out-mode=1 or 3 then GENPIN='10' or '11'
   If cpin-mode=0 then EPIN=0
   reserved=X'0'
2. Checking on C2 if (out-mode=1 or 3)
   CV type="data/compatibility" or "data/privacy"
   E usage bit=1
   D usage bit=0
3. Checking on C3 if cpin-mode=1.
   cv type="PIN KEY/PEK"
   GEN PIN usage bit=1

Verify IBM 3624 PIN (VPIN)

Equation:
e*KM.C1(KPV), e*KM.C2(KPE), eKPE(PIN) [PIN]
dec-tab,val-data,a-in-len,p-chk-len,offset,pin-mode,C1,C2
— PIN OK or PIN NOT OK

| Inputs: | |
|---|---|
| e*KM.C1(KPV) | KPV is the 64 bit PIN validation key, triple encrypted under KM with a control vector C1. PIN generating key (KPG) and the PIN validation key (KPV) have to be one and the same keys to verify the PIN. The key names KPV and KPG are used for the notation only. |
| e*KM.C2(KPE) | KPE is the 64 bit PIN encrypting key, triple encrypted under KM with a control ector C2. |
| eKPE(PIN) | eKPE(PIN) is the 64 bit formatted PIN encrypted under PIN input protection key. Create PIN block is used to encrypt the formatted PIN. PIN is a 64 bit formatted PIN in IBM 3624 format. This s a standard input to the verify pin function. |
| PIN | PIN is a 64 bit (16 decimal coded digits), input PIN in clear form. This optional input must be provided if pin-mode = 0 is specified to the function. The clear input PIN will be only permitted if the IN verification key permits clear PINs to the function. The clear input PINs are permitted by the CCA to be compatible with the existing system requirements. |
| dec-tab | decimalization table is a 64 bit plain input which represents 16 decimal digits to be used in the PIN verification process. |
| val-data | valid data is a 64 bit users data, padding included. Ordinarily it will be the user's PAN. |
| a-pin-len | a-pin-len is the number (1-16) indicating how many digits of the generated PIN is assigned to the customer; this is the number of digits of the intermediate PIN. |
| p-chk-len | p-chk-len is the number (1-16) indicating how many digits of the PIN assigned to the customer are checked in the verification process. These digits are selected from right to left from the Intermediate pin and customer entered PIN. |
| offset | offset is a 64 bit data, representing 1-16 decimal digits, used by the PIN verification process if the PIN was user selected. The offset data reflects the difference between the PIN that is selected by the customer and the intermediate PIN that is generated by the validation procedure. |
| pin-mode | pin-mode indicates the PIN entered is in clear or encrypted. 0: clear 1: encrypted |
| C1,C2 | C1 and C2 are the control vectors for KPV and KPE |
| Outputs: | PIN-OK or PIN-NOT-OK |

Description: The VPIN instruction generates an IBM 3624 formatted PIN from the validation data and a PIN validation key and compares it with the customer entered PIN. The customer entered PIN is an IBM 3624 formatted PIN which can be in clear or encrypted form.

The pin-mode indicates whether the entered PIN is in the clear or encrypted under a PIN encrypting key. Clear PIN input will only be permitted if the PIN verification key is allowed to use clear PIN inputs.

The Offset input is in clear. The entered PIN and the Offset are added (MOD 10) using only the left most digits equal to the length of A-pin-len. This result is compared with the intermediate PIN using only the right most digits equal to the length of P-chk-len. The output of this function is YES/NO on the compare of the PINs as illustrated above.

CC:
1. successful operation
2. C1 or C2 is invalid 3. invalid entered PIN
4. invalid decimalization table
5. unsuccessful operation (error).

Control Vector Checking:
1. Checking on C1
   cv type="PIN KEY/PGK"
   VERPIN usage bit=1
   If pin-mode=1 then EPIN=1
   reserved=X'0'
2. Checking on C2 if pin-mode=1
   cv type="PIN KEY/PEK"
   VERPIN usage bit=1
   reserved=X'0'

PIN Translate (PINT)

Equation:
e*KM.C1(KPE1),[e*KM.C2(KPE2)],eKPE1(PIN),format-in,format-out,
pad-in,pad-out,seq-in,seq-out,pan,kp2-mode,C1,C2
— eKPE2(PIN_Block) or
eKPE3(PIN_Block), e*KM.C2(KPE3)

Inputs:

| | |
|---|---|
| e*KM.C1(KPE1) | KPE1 is the 64 bit PIN encrypting key, triple encrypted under KM with a control vector C1 and used to encrypt the formatted PIN inputs. |
| e*KM.C2(KPE2) | KPE2 is an optional 64 bit PIN encrypting key, triple encrypted under KM with a control vector C2, used to encrypt the translated PIN for output. KPE2 may or may not be equal to KPE1. If KPE2 is not supplied, a randomly generated KPE3 will be used to encrypt the translated PIN. |
| eKPE1(PIN) | This is a 64 bit encrypted formatted PIN under KPE1 key. |
| format-in | This is a 64 bit encrypted formatted PIN under KPE1 key. |
| format-in | This is a 64 bit encrypted formatted PIN under KPE1 key.<br>0000: IBM 3624 format<br>0001: IBM 3621 format<br>0010: ANSI format<br>0011: 4704 format (encrypting key pad)<br>0100: Docutel, Diebold, NCR<br>0101: Burroughs<br>0110: ISO format<br>0111: not used<br>1XXX: not used |
| format-out | 4 bit code indicating the PIN format output.<br>0000: IBM 3624 format<br>0001: IBM 3621 format<br>0010: ANSI format<br>0011: 4704 format (encrypting key pad)<br>0100: Docutel, Diebold, NCR<br>0101: Burroughs<br>0110: ISO format<br>0111: not used<br>1XXX: not used |
| pad-in | This is a pad-in character, a 4 bit value from X'0' to X'F', to be used to format a PIN according to the PIN format. The pad character and the number of padding characters depend upon the type of format input. |
| pad-out | This is a pad-out character, a 4 bit value from X'0' to X'F', to be used to format a PIN according to the PIN format. The pad character and the number of padding characters depend upon the type of format output. |
| seq-in | A two byte Sequence number. If the input PIN format requires only a one byte sequence number, then the least significant byte of seq-in will be used. Seq-in may or may not be required depending upon the format-in. |
| seq-out | A two byte Sequence number. If the output PIN format requires only a one byte sequence number, then the least significant byte of seq-out will be used. Seq-out may or may not be required depending upon the format-out. |
| pan | Twelve 4-bit digits representing the "rightmost" (least significant) 12 digits of the primary account number. Pan may or may not be required depending upon the format (Check digits not included.) |
| kp2-mode | kp2-mode indicates whether a key encrypting key is supplied or has to be randomly generated securely. When KPE2 is supplied, it is supplied in encrypted form e*KM.C2(KPE2), so that the key is not exposed in clear outside the crypto facility.<br>0: KPE2 supplied<br>1: KPE3 has to be generated randomly<br>When KPE3 is generated randomly, it has to be generated in the crypto facility and implies that any reformat combination is allowed. When KPE2 is supplied, certain translation combinations must be disallowed based on an implementation dependent, secure mapping table. See Note under Description below. |
| C1,C2 | C1 and C2 are the control vectors for KPE1, KPE2 respectively. KPE2 is supplied or output depending on kp2-mode equal to '0' or '1'. C2 is always supplied to the function. |

Outputs:

| | |
|---|---|
| eKPE2(PIN_Block) | e(KPE2(PIN_Block) is the 64 bit translated PIN encrypted under PIN encrypting key KPE2; the PIN is translated according to the output format specification. |
| eKPE3(PIN_Block), e*KM.C2(KPE3) | eKPE3(PIN)_Block) is the 64 bit translated PIN encrypted under PIN encrypting key KPE3; the PIN is translated according to the output format specification. e*KM.C2(KPE3) is a randomly generated triple encrypted key, KPE3, under KM with a control vector C2. |

Description: The PIN translate (PINT) function is used to translate the PIN from one PIN block format to another PIN block format without the PIN appearing in clear outside the cryptographic facility. The PIN is securely translated from one pin encrypting key to the other pin encrypting key. The PIN Block formats are described in FIG. 8.

The PIN encrypting keys KPE1, KPE2 could be the same or different. If they are the same then the input parameters e*KM.C1(KPE1) and e*KM.C2(Kpe2) are euqal and C1=C2.

NOTE: Certain reformatting combinations (as selected by format-in and format-out) may weaken the security of an encrypted PIN. If an opponent were permitted to generate all formats of encrypted PINs under a fixed output key, a dictionary attack could be waged. For this reason, the permissible combinations must be restricted whenever KPE2 is specified on input. A suggested method is to define an 8*8 mapping table of bit entries, indexed by format-in and format-out. The bit entry for a specified reformat combination is set to '1' if the combination is permitted, otherwise it is zero. This table must be stored/accessed with integrity (e.g. within the CF).

One method to load this table with integrity is via a handheld keypad attached to the CF through a secure front-panel interface. The keypad is enabled by a front-panel keyswitch. The physical key may be held by trusted security personnel. The CF may include one or more instructions, such as LOAD_XLATE_AUTHORITY_TABLE, which verify that the physical keyswitch is in the enable position and then transfer the contents of the keypad buffer into the internal table storage locations. If the keyswitch is not in the proper position, the instruction aborts with an appropriate error code. An alternative to the physical keyswitch would be to require the security personnel to enter a secret password. The instruction would then cryptographically verify the password before updating the internal table. The new table contents need not come from an external device, such as the keypad. Although less secure, an application program could pass this table to the CF through programming interfaces. Again, however, the transfer should be enabled via a physical keyswitch or personnel-entered password. The method chosen to load the authorization table is up to the implementor. The goal is to provide a means to securely load the table into the CF, thereby preventing substitution or modification by unauthorized personnel. The table is referenced by PINT whenever an explicit KPE2 is supplied as an input parameter.

On the other hand, if KPE2 is not specified, KPE3 is randomly generated and thus cannot be used to reformat PINs under a fixed key. The reformatted, encrypted output PIN is essentially cryptographically separate from the input PIN. For that reason, no combination restrictions are required if KPE3 is randomly generated.

In either case, the output PIN may be used as input to the PIN verification function or sent to another node.
CC:
1. successful operation
2. C1 or C2 is invalid
3. invalid format
4. unsuccessful operation (error)

Control Vector Checking:
1. Checking on C1
   cv type="PIN KEY/PEK"
   PIN XLT IN usage bet=1
   reserved=X'0'
2. Checking on C2
   cv type="PIN KEY/PEK"
   PIN XLT OUT usage bet=1
   reserved=X'0'

STANDARDS AND DEFINITIONS

Standards

ANSI X2.92—1981 *"Data Encryption Algorithm"*.
ANSI X9.106—1983 *"Modes of DEA Operation"*.
ANSI X9.2—198X *"Interchange Message Specificatin for Debit and Credit Card Message Exchange Among Financial Institutions"*. This standard specifies a common interface by which bank card originated messages relating to a financial transaction may be interchanged between private sysstems. It specifies message structure, format and content, data elements and values for data elements.

ANSI X9.8—1982 *"American National Standard for Personal Identification Number (PIN) Management and Security"*. This standard establishes standards and guidelines for the management and security of the Personal Identification Number's (PIN's) life cycle.

ANSI X9.9—1986 *"American National Standard for Financial Institution Message Authentication (Wholesale)"*. This standard established a method to authenticate financial messages (wholesale), including fund transfers (e.g. wire transfers), letters of credit, security transfers, loan agreements and foreign exchange contracts.

ANSI X9.17—1985 *"Financial Institution Key Management (Wholesale)"*. This standard establishes methods (including the protocol) for the generation, exchange and use of cryptographic keys of authentication and encryption.

ANSI X9.19—198X *"Financial Institution Retail Message Authentication"*. This standard establishes a method to authenticate financial messages for retail transactions.

ANSI X9.23—198X *"Encryption of Wholesale Financial Messages"*. This standard established a method to encrypt wholesale financial messages in order to provide confidentiality (e.g., wire transfers, letters of credit, etc.)

ISO DIS 8583 *"Bank Card Originated Messages—Interchange Message Specifications—Content for Financial Transactions"*. This international standard specifies a common interface by which bank card originated messages relating to a financial transaction may be interchanged between private systems. It specifies message structure, format and content, data elements and values.

ISO DIS 8720 *"Message Authentication"*

ISO DP 8730 *"Banking—Requirements for Standard Message Authentication (wholesale)"*. This international standard specifies a technique for protecting the authenticity of messages passing between financial institutions by means of a Message Authentication Code (MAC).

ISO DP 8731 *"Banking—Approved Algorithms for Message Authentication—Part 1: DES-1 Algorithm"*. This part of ISO 8731 deals with the Data Encryption Algorithm (DEA-1) as a method for use in the calculation of the Message Authentication Code (MAC). Part-2 Other non DEA Algorithms ISO DP 8732 *"Banking—Key Management Wholesale"* This international standard specifies methods for the management of keying material used for the encryption and authentication of messages exchanged in the course of wholesale financial transactions.

ISO DP 9546 *"Personal Identification Number Management and Security Part 1—PIN Protection Principles and Technique"* This standard specifies the minimum security measures required for effective PIN management. Standard means of interchanging PIN data are provided.

Figure 1:
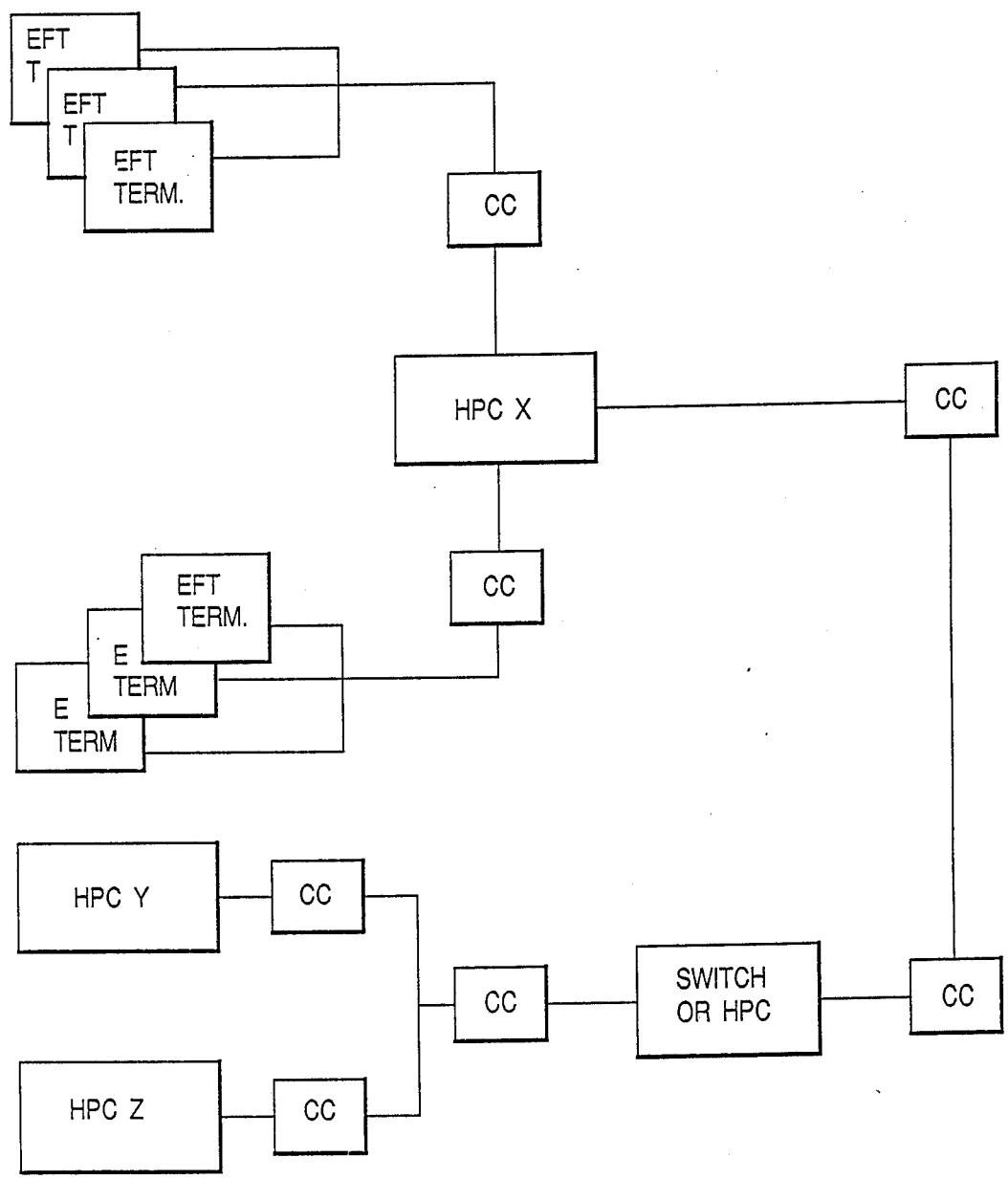
FIG. 1 illustrates an EFT network configuration which supports interchange.
Figure 2:
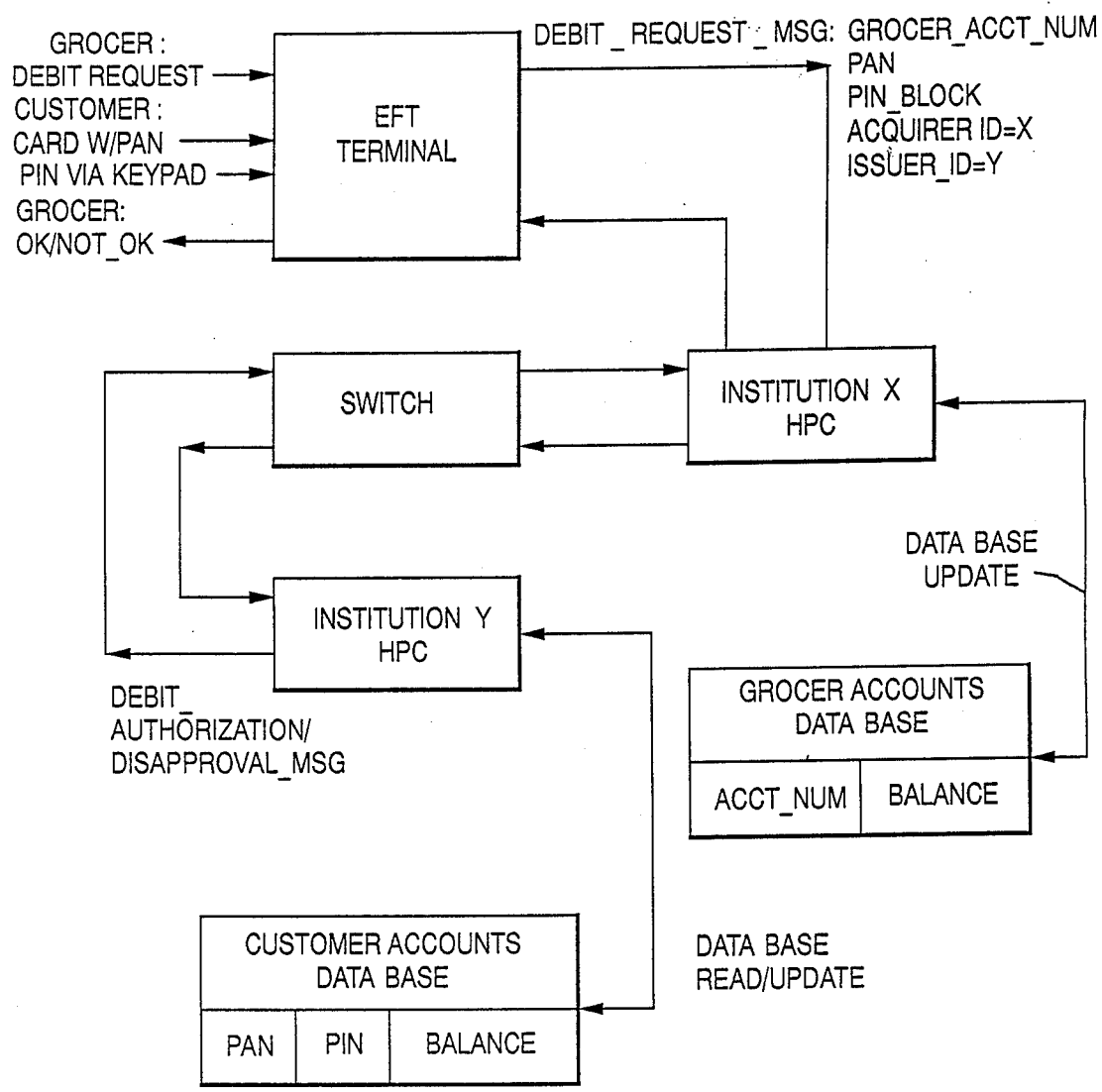
FIG. 2 shows a non-cryptographic PIN processing transaction in an EFT network.
Figure 3:
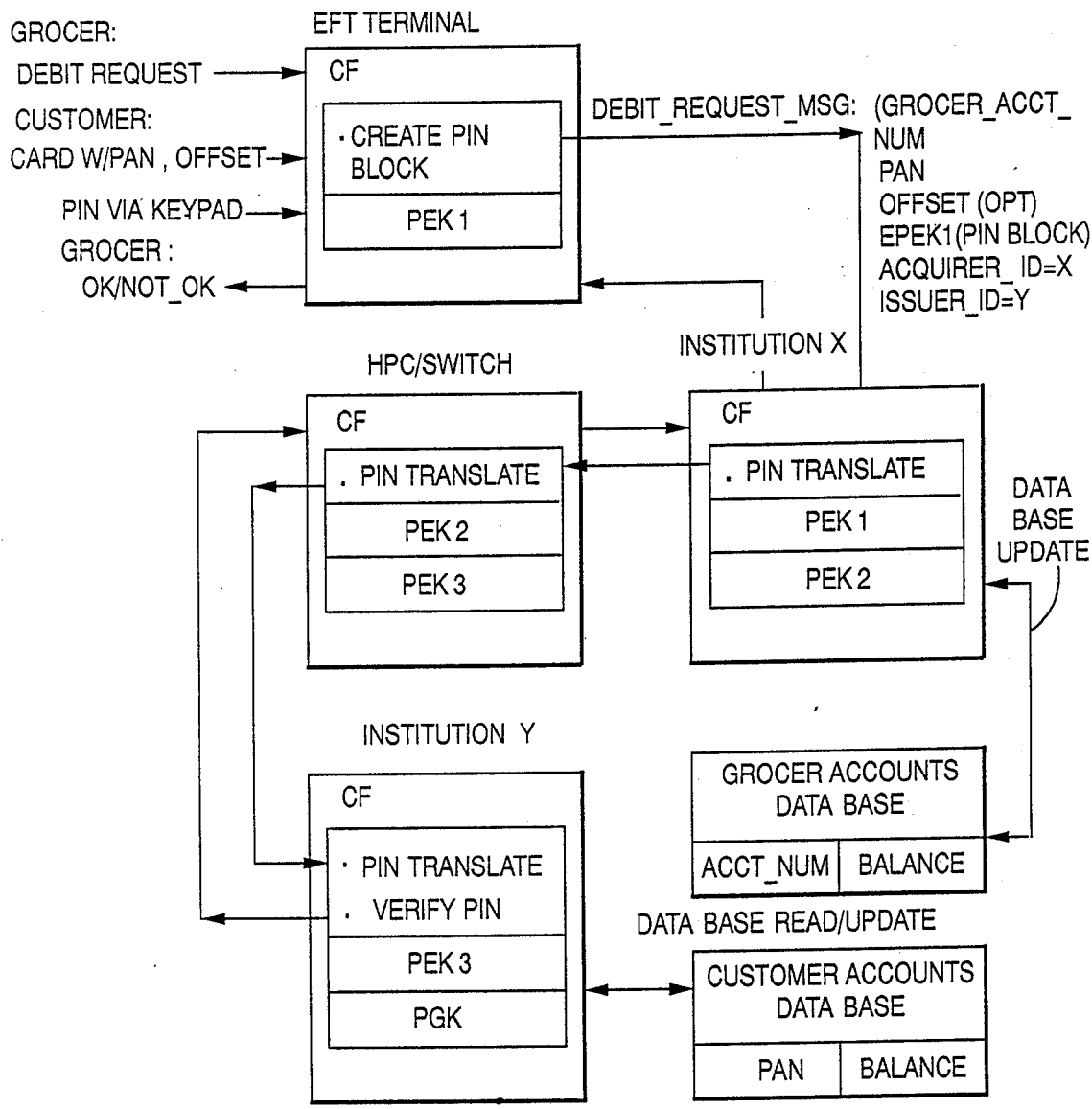
FIG. 3 shows a cryptographic PIN processing transaction in an EFT network.
Figure 4:
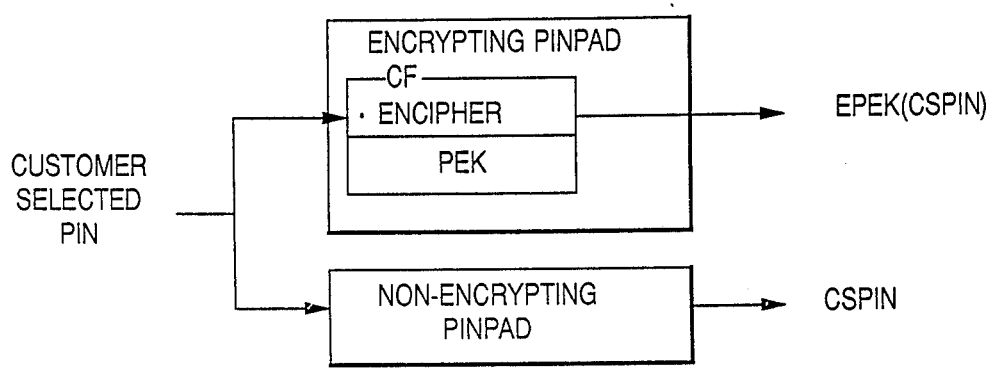
FIG. 4 shows two methods for entering a customer selected PIN into a PIN generating (or card issuing) system.
Figure 5:
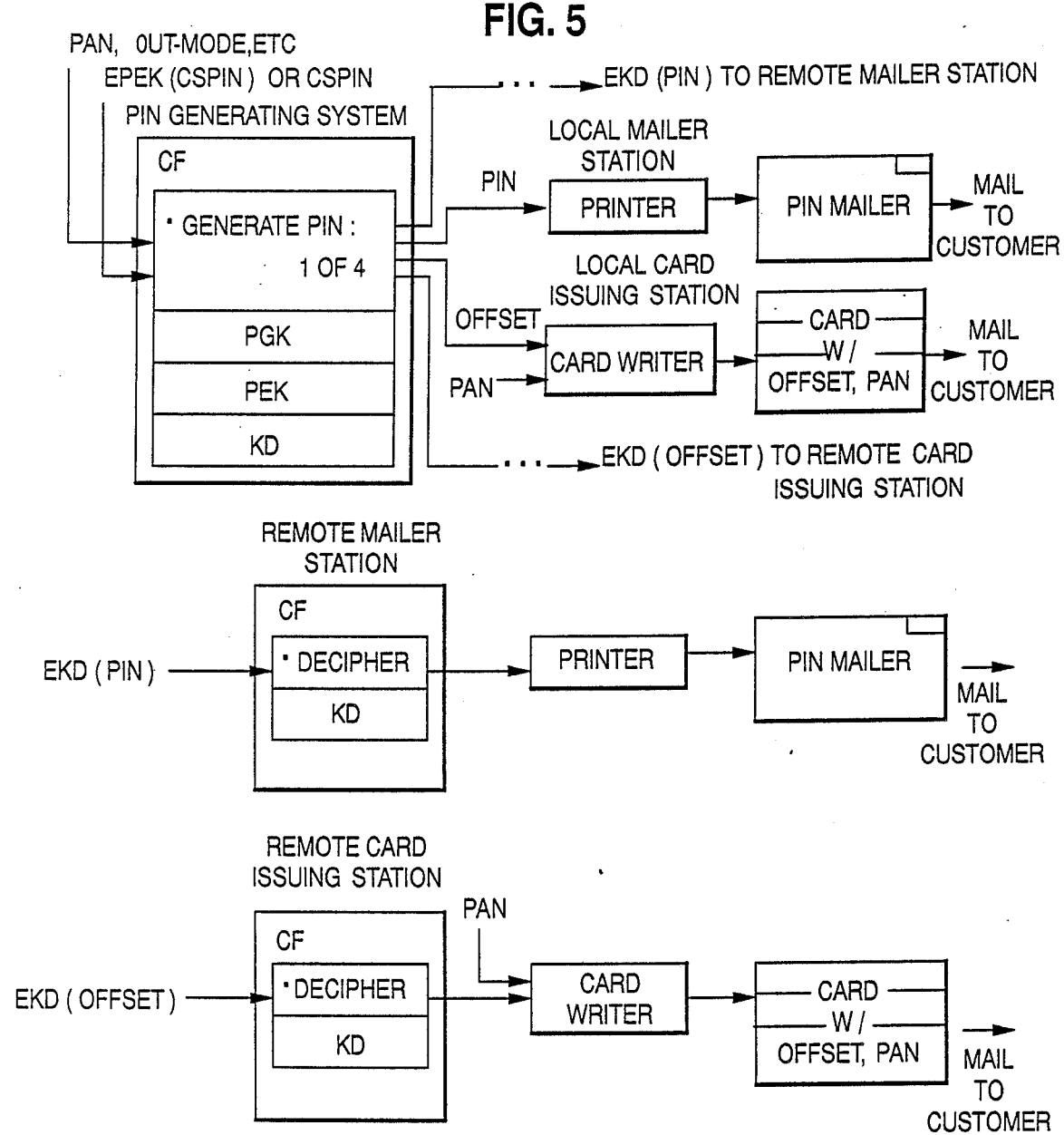
FIG. 5 shows a PIN generating system for the card issuer. PIN Offsets, PANs and other data are written to new bank cards at local or remote stations. PINs are printed on secure PIN mailers at local or remote printer stations.

In an alternate embodiment of the invention, clear keys can be stored in the crypto facility for immediate availability in cryptographic operations. Those clear keys can be stored for example in the working storage 24 in FIG. 1 of the crypto facility.

In a first method, each key and its associated control vector are stored as a paired expression in the RAM within the crypto facility. Each such key and control vector are initialized within the crypto facility, in advance of their intended use, via a special authorized procedure available only to authorized system personnel (e.g., a security officer). A procedure similar to initializing a master key (e.g., via a hand-held key entry device attached to a front panel interface, which is enabled via a physical key-activated key switch) could easily be adapted for initializing keys and control vectors within the crypto facility. Methods for initializing parameters within the crypto facility are well-known in the art. During routine operations, in order to access a particular key, the associated control vector is first accessed and the control vector checking operation is carried out as has been previously described, in order to ensure that the proposed key usage is authorized. If the authorization is affirmative, then the corresponding key is accessed from the RAM and is used for the intended operations within the crypto facility.

In a second method, the exclusive-OR product of the key and its associated control vector are stored in the RAM inside the crypto facility, i.e., instead of storing the key and control vector paired expression (as with the first method) and key and control vector are exclusive-ORed and the product of the exclusive-OR operation is stored in the RAM inside the crypto facility. A procedure for initializing the crypto facility could be based on performing the exclusive-OR operation of the key and control vector outside the crypto facility and then entering their product as a parameter using a procedure similar to that for entering the key and control vector, as described for the first method. Alternatively, the key and control vector could be exclusive-ORed within the crypto facility and the product then stored as before. Later on, the steps to access a key can be traced as follows. An instruction which designates the use of a particular key must also provide the control vector associated with that key as a parameter of the instruction. The control vector is first checked, as before, using the control vector checking operation, in order to ensure that the proposed key usage is authorized. If the authorization is affirmative, the exclusive-OR product of the key and control vector stored in the crypto facility is accessed and exclusive-ORed with the control vector supplied as a parameter to the instruction to recover the clear key which is then used in the intended cryptographic operations. It can be seen that if cheating is attempted, i.e., a false control vector is specified in an instruction, then the clear value of the recovered key is not correct (i.e., is not the correct key value). The crypto instructions are designed such that no useful outputs are obtained when an incorrect key value is produced as a result of such control vector cheating. In the second method, the preferred form for storing the key K is to use the exclusive-OR as the combining function, F, between the key and its control vector C, forming a product, and the inverse combining function, $F^{-1}$, is the exclusive-OR of the product with the control vector. However, there may be particular applications where other combining functions, F, and their inverses, $F^{-1}$, are more appropriate. For example, applications requiring greater security can define F as an encrypting transformation, for example where the key K is encrypted under its control vector C forming eC(K), and the inverse transformation is a decrypting function, for example where eC(K) is decrypted under C.

Although specific embodiments of the invention have been disclosed, it will be understood by those having skill in the art that changes can be made to these specific embodiments without departing from the spirit and the scope of the invention.

What is claimed is:

1. In a data processing system which outputs cryptographic service requests for management of cryptographic keys which are associated with control vectors defining the functions which each key is allowed by its originator to perform, an apparatus for validating that PIN processing functions requested for a cryptographic key have been authorized by the originator of the key, comprising:

a cryptographic instruction storage coupled to an input path;

a cryptographic facility characterized by a secure boundary through which passes said input path for receiving said cryptographic service requests, cryptographic keys and their associated control vectors, and an output path for providing responses thereto, there being included within said boundary a control vector checking means and a cryptographic processing means coupled to said instruction storage, and a master key storage coupled to said processing means, for providing a secure location for executing PIN processing functions in response to said received service requests;

said cryptographic instruction storage receiving over said input path a cryptographic service request for performing a PIN processing function with a cryptographic key;

said control vector checking means having an input coupled to said input path for receiving a control vector associated with said cryptographic key and an input connected to said cryptographic instruction storage, for receiving control signals to initiate checking that said control vector authorizes the PIN processing function which is requested by said cryptographic service request;

said control vector checking means having an authorization output coupled to an input of said cryptographic processing means, for signalling that said PIN processing function is authorized, the receipt of which by said cryptographic processing means initiates the performance of the requested PIN processing function with said cryptographic key.

2. The apparatus of claim 1, which further comprises:
   a cryptographic key storage means coupled to said cryptographic facility over said input and output paths, for storing said cryptographic key in an encrypted form in which said cryptographic key is encrypted under a storage key which is a logical product of said associated control vector and a master key stored in said master key storage.

3. The apparatus of claim 1, wherein said PIN processing is achieved by associating said control vector with a PIN generating key, to provide authorization for the use of the key intended by the originator of the key.

4. The apparatus of claim 1, which further comprises said PIN processing being achieved by associating control vectors with PIN verification keys, said control vectors providing authorization for the uses of the keys intended by the originators of the keys.

5. The apparatus of claim 1, which further comprises said PIN processing being achieved by associating control vectors with PIN encrypting keys, said control vectors providing authorization for the uses of the keys intended by the originator of the keys.

6. The apparatus of claim 1, wherein said control vector specifies limitations on the authority to use the associated key with certain PIN processing instructions.

7. The apparatus of claim 1, wherein said control vector places limitations on the authority to use the associated key for PIN generation functions.

8. The apparatus of claim 1, which further comprises said control vector placing limitations on the authority to use the associated key in PIN verification functions.

9. The apparatus of claim 1, wherein said control vector places limitations on the authority to use the associated key in PIN translation functions.

10. The apparatus of claim 1, wherein said control vector places limitations on the authority to use the associated key in PIN block creation functions.

11. The apparatus of claim 1, wherein said control vector places limitations on the authority to use the associated key to process clear PIN inputs.

12. The apparatus of claim 1, wherein said control vector places limitations on the authority to use the associated key for PIN processing functions having a particular PIN format.

13. The apparatus of claim 1, which further comprises
a working key storage within said cryptographic facility coupled to said cryptographic processing means, for providing a secure location for the storage of working keys.

14. The apparatus of claim 13, which further comprises:
said working key storage storing a plurality of working keys and their associated control vectors in clear text form.

15. The apparatus of claim 14, which further comprises:
said cryptographic facility receiving over said input path a cryptographic service request for performing PIN processing function;
said control vector checking means checking the associated control vector accessed from said working key storage and outputting an authorization signal to said cryptographic processing means that said cryptographic service request is authorized using the respective key accessed from said working key storage.

16. The apparatus of claim 14, which further comprises:
said working keys being stored in said working key storage as the exclusive-OR product of each key with its respective control vector.

17. The apparatus of claim 16, which further comprises:
said cryptographic facility receiving over said input path a cryptographic service request for performing a PIN processing function and also receiving the corresponding associated control vector which undergoes control vector checking in said control vector checking means;
said control vector checking means outputting an authorization signal to said cryptographic processing means that said cryptographic service request is authorized, said corresponding exclusive-OR product of the control vector and its respective key then being exclusive-ORed with said control vector in order to recover the key for the requested cryptographic operation.

18. The apparatus of claim 1, which further comprises:
a working key storage within said cryptographic facility, for storing working keys in clear text form and for storing their respective associated control vectors;
said cryptographic instruction storage receiving over said input path a cryptographic service request for performing a PIN processing function which includes accessing said cryptographic key and said associated control vector from said working key storage and said control vector checking means outputting in response thereto, an authorization signal to said cryptographic processing means that the requested PIN processing function is authorized;
said cryptographic processing means operating in response to said authorization signal, to complete performing the requested PIN processing function with said cryptographic key.

19. The apparatus of claim 1, which further comprises:
a working key storage within said cryptographic facility coupled to said cryptographic processing means, for storing the exclusive-OR product of working keys and their associated control vectors;
said cryptographic instruction storage receiving over said input path a cryptographic service request and the corresponding associated control vector, for performing a PIN processing function;
said control vector checking means checking said control vector and outputting in response thereto, an authorization signal to said cryptographic processing means that the requested PIN processing function is authorized;
said cryptographic processing means operating in response to said authorization signal, to perform an exclusive-OR operation between said control vector and said product which has been accessed from said working key storage, yielding said working key in clear text form;
said cryptographic processing means further operating in response to said authorization signal, to complete performing the requested PIN processing function with said cryptographic key.

20. In a data processing system which outputs cryptographic service requests for PIN processing using cryptographic keys which are associated with control vectors defining the functions which each key is allowed by its originator to perform, a method for validating that PIN processing functions requested for a cryptographic key have been authorized by the originator of the key, comprising the steps of:
receiving a cryptographic service request for performing a PIN processing function on a cryptographic key in a cryptographic facility characterized by a secure boundary through which passes an input path and an output path;
receiving a control vector associated with said cryptographic key and checking that said control vector authorizes the PIN processing function which is requested by said cryptographic service request;
signalling that said PIN processing function is authorized and initiating the performance of the requested PIN processing function with said cryptographic key.

21. The method of claim 20, which further comprises the steps of:

storing in a storage means said cryptographic key in an encrypted form in which said cryptographic key is encrypted under a storage key which is a logical product of said associated control vector and a master key.

22. The method of claim 20, wherein said PIN processing is achieved by associating said control vector with a PIN generating key, to provide authorization for the use of the key intended by the originator of the key.

23. The method of claim 20, which further comprises said PIN processing being achieved by associating control vectors with PIN verification keys, said control vectors providing authorization for the uses of the keys intended by the originators of the keys.

24. The method of claim 20, which further comprises said PIN processing being achieved by associating control vectors with PIN encrypting keys, said control vectors providing authorization for the uses of the keys intended by the originator of the keys.

25. The method of claim 20, wherein said control vector specifies limitations on the authority to use the associated key with certain PIN processing instructions.

26. The method of claim 20, wherein said control vector places limitations on the authority to use the associated key for PIN generation functions.

27. The method of claim 20, which further comprises said control vector placing limitations on the authority to use the associated key in PIN verification functions.

28. The method of claim 20, wherein said control vector places limitations on the authority to use the associated key in PIN translation functions.

29. The method of claim 20, wherein said control vector places limitations on the authority to use the associated key in PIN block creation functions.

30. The method of claim 20, wherein said control vector places limitations on the authority to use the associated key to process clear PIN inputs.

31. The method of claim 20, wherein said control vector places limitations on the authority to use the associated key for PIN processing functions having a particular PIN format.

32. The method of claim 20, wherein said control vectors define node linkages to be allowed by said originator.

33. The method of claim 20, which further comprises:
storing a plurality of working keys and their associated control vectors in clear text form in a working key storage within said cryptographic facility.

34. The method of claim 33, which further comprises:
receiving over said input path a cryptographic service request for performing a PIN processing function;
checking the associated control vector accessed from said working key storage and outputting an authorization signal that said cryptographic service request is authorized using the respective key accessed from said working key storage.

35. The method of claim 33, which further comprises:
said working keys being stored in said working key storage as the exclusive-OR product of each key with its respective control vector.

36. The method of claim 35, which further comprises:
receiving over said input path a cryptographic service request for performing a PIN processing function and also receiving the corresponding associated control vector which undergoes control vector checking;
outputting an authorization signal that said cryptographic service request is authorized, said corresponding exclusive-or product of the control vector and its respective key then being exclusive-ORed with said control vector in order to recover the key for the requested cryptographic operation.

37. The method of claim 20, which further comprises:
storing working keys in clear text form and storing their respective associated control vectors in a working key storage within said cryptographic facility;
receiving over said input path a cryptographic service request for performing a PIN processing function which includes accessing said cryptographic key and said associated control vector from said working key storage and outputting in response thereto, an authorization signal that the requested PIN processing function is authorized;
performing the requested PIN processing function with said cryptographic key in response to said authorization signal.

38. The method of claim 20, which further comprises:
storing the exclusive-OR product of working keys and their associated control vectors in a working key storage within said cryptographic facility;
receiving over said input path a cryptographic service request and the corresponding associated control vector, for performing a PIN processing function;
checking said control vector and outputting in response thereto, an authorization signal that the requested PIN processing function is authorized;
operating in response to said authorization signal, to perform an exclusive-OR operation between said control vector and said product which has been accessed from said working key storage, yielding said working key in clear text form;
further operating in response to said authorization signal, to complete performing the requested PIN processing function with said cryptographic key.

39. The method of claim 20, wherein said control vector selectively limits the authority of said PIN processing function to process clear PIN inputs.

40. The method of claim 20, wherein said control vector selectively limits the authority of said PIN processing function to process a predetermined PIN format.

41. The method of claim 20, wherein said control vector selectively limits the authority of said PIN processing function to use as a predetermined processing algorithm.

42. The method of claim 20, wherein said control vector selectively limits the authority of said PIN processing function to use said cryptographic key in PIN generation.

43. The method of claim 20, wherein said control vector selectively limits the authority of said PIN processing function to use said cryptographic key in PIN verification.

44. The method of claim 20, wherein said control vector selectively limits the authority of said PIN processing function to use said cryptographic key in PIN translation.

45. The method of claim 20, wherein said control vector selectively limits the authority of said PIN processing function to use cryptographic key in PIN block creation.

46. The apparatus of claim 14, which further comprises:
  said working keys being stored in said working key storage as a product of a combining function F of each key with its respective control vector.

47. The apparatus of claim 46, which further comprises:
  said cryptographic facility receiving over said input path a cryptographic service request for performing a PIN processing function and also receiving the corresponding associated control vector which undergoes control vector checking in said control vector checking means;
  said control vector checking means outputting an authorization signal to said cryptographic processing means that said cryptographic service request is authorized, said corresponding product of the control vector and its respective key then being operated upon by an inverse combining function $F^{-1}$ with said control vector in order to recover the key for the requested cryptographic operation.

48. The apparatus of claim 1, which further comprises:
  a working key storage within said cryptographic facility coupled to said cryptographic processing means, for storing a product of a combining function F of working keys and their associated control vectors;
  said cryptographic instruction storage receiving over said input path a cryptographic service request and the corresponding associated control vector, for performing a PIN processing function;
  said control vector checking means checking said control vector and outputting in response thereto, an authorization signal to said cryptographic processing means that the requested PIN processing function is authorized;
  said cryptographic processing means operating in response to said authorization signal, to perform an operation with an inverse combining function $F^{-1}$ between said control vector and said product which has been accessed from said working key storage, yielding said working key in clear text form;
  said cryptographic processing means further operating in response to said authorization signal, to complete performing the requested PIN processing function with said cryptographic key.

49. The method of claim 20, which further comprises:
  storing a plurality of working keys and their associated control vectors in a working key storage as a product of each key and its respective control vector, using a combining function F.

50. The method of claim 49, which further comprises:
  receiving over said input path a cryptographic service request for performing a PIN processing function and also receiving the corresponding associated control vector which undergoes control vector checking;
  outputting an authorization signal that said cryptographic service request is authorized, said corresponding product of the control vector and its respective key then being operated upon by an inverse combining function $F^{-1}$ with said control vector in order to recover the key for the requested cryptographic operation.

51. The method of claim 20, which further comprises:
  storing a product of a combining function F of working keys and their associated control vectors in a working key storage within said cryptographic facility;
  receiving over said input path a cryptographic service request and the corresponding associated control vector, for performing a PIN processing function;
  checking said control vector and outputting in response thereto, an authorization signal that the requested PIN processing function is authorized;
  operating in response to said authorization signal, to perform an operation with an inverse combining function $F^{-1}$ between said control vector and said product which has been accessed from said working key storage, yielding said working key in clear text form;
  further operating in response to said authorization signal, to complete performing the requested PIN processing function with said cryptographic key.

* * * * *